United States Patent
Kawashima et al.

(10) Patent No.: US 7,595,371 B2
(45) Date of Patent: Sep. 29, 2009

(54) ETHYLENE-α-OLEFIN COPOLYMER AND FOOD PACKAGING MATERIAL

(75) Inventors: Yasutoyo Kawashima, Ichihara (JP); Katsuhiro Yamada, Chiba (JP); Yoshinobu Nozue, Ichihara (JP)

(73) Assignee: Sumitomo Chemical Company, Limited, Tokyo (JP)

( * ) Notice: Subject to any disclaimer, the term of this patent is extended or adjusted under 35 U.S.C. 154(b) by 0 days.

(21) Appl. No.: 11/905,182

(22) Filed: Sep. 27, 2007

(65) Prior Publication Data

US 2008/0146761 A1    Jun. 19, 2008

(30) Foreign Application Priority Data

Sep. 29, 2006    (JP) ............................ 2006-267181

(51) Int. Cl.
*C08F 210/16*    (2006.01)

(52) U.S. Cl. ................ 526/348.2; 526/348; 526/348.1; 526/348.4; 526/348.5

(58) Field of Classification Search ................ 526/348, 526/348.1, 348.2, 348.4, 348.5
See application file for complete search history.

(56) References Cited

U.S. PATENT DOCUMENTS

| | | | | |
|---|---|---|---|---|
| 2005/0098927 A1* | 5/2005 | Iseki et al. | ................ | 264/464 |
| 2006/0089475 A1* | 4/2006 | Iseki et al. | ................ | 526/348 |
| 2006/0089476 A1* | 4/2006 | Iseki et al. | ................ | 526/348 |

* cited by examiner

*Primary Examiner*—Roberto Rábago
(74) *Attorney, Agent, or Firm*—Birch, Stewart, Kolasch & Birch, LLP

(57) ABSTRACT

An ethylene-α-olefin copolymer comprising repeating units derived from ethylene and repeating units derived from an α-olefin having 3 to 20 carbon atoms and having a melt flow rate (MFR) of from 0.01 to 100 g/10 min, a density (d) of from 890 to 970 kg/m$^3$, a flow activation energy (Ea) of 50 kJ/mol or more, a molecular weight distribution (Mw/Mn) of 3 or more measured by gel permeation chromatography, and a hexane extraction rate (C) of 2.8% or less.

7 Claims, No Drawings

ETHYLENE-α-OLEFIN COPOLYMER AND FOOD PACKAGING MATERIAL

FIELD OF THE INVENTION

The present invention relates to an ethylene-α-olefin copolymer and a food packaging material comprising the copolymer.

BACKGROUND ART

Molded articles formed by extrusion molding of ethylene-α-olefin copolymers are widely used for films, sheets, containers, etc. which are used for packaging foods, medicines, dairy necessities, and the like. The ethylene-α-olefin copolymers used for these molded articles are required to have excellent molding processability such as a low extrusion load and high processing stability. As an example of a proposed copolymer having such properties, JP-A-2005-97481 discloses a copolymer of ethylene and an α-olefin copolymerized by using a catalyst prepared by allowing triisobutylaluminum to contact to racemic ethylene bis(1-indenyl) zirconium diphenoxide followed by contacting a co-catalyst carrier formed by reacting diethyl zinc, pentafluorophenol, water, silica and trimethyldisilazane.

However, the ethylene-α-olefin copolymer of JP-A-2005-97481 is not satisfactory since it often fumes in melt processing, although it has excellent molding processability.

SUMMARY OF THE INVENTION

An object of the present invention is to provide an ethylene-α-olefin copolymer having excellent molding processability and a low fuming property in melt processing Another object of the present invention is to provide a food packaging material comprising such a copolymer.

Accordingly, the present invention provides an ethylene-α-olefin copolymer comprising repeating units derived from ethylene and repeating units derived from an α-olefin having 3 to 20 carbon atoms and having a melt flow rate (MFR) of from 0.01 to 100 g/10 min, a density (d) of from 890 to 970 kg/m$^3$, a flow activation energy (Ea) of at least 50 kJ/mol, a molecular weight distribution (Mw/Mn) of at least 3 measured by gel permeation chromatography, and a hexane extraction rate (C) of 2.8% or less.

The present invention also provides a food packaging material comprising the ethylene-α-olefin copolymer of the present invention

DETAILED DESCRIPTION OF THE INVENTION

The ethylene-α-olefin copolymer of the present invention contains repeating units derived from ethylene and repeating units derived from an α-olefin having 3 to 20 carbon atoms. Examples of the α-olefin include propylene, 1-butene, 1-pentene, 1-hexene, 1-heptene, 1-octene, 1-nonene, 1-decene, 1-dodecene, 4-methyl-1-pentene, and 4-methyl-1-hexene. These olefins may be used alone, or as a mixture of two or more of them. The α-olefin is preferably 1-hexene, 4-methyl-1-pentene and 1-octene, more preferably 1-hexene and 1-octene.

In the ethylene-α-olefin copolymer of the present invention, the content of the repeating units derived from ethylene is usually from 50 to 99.5 wt % based on the total weight (100 wt %) of the ethylene-α-olefin copolymer, while the content of the repeating units derived from the α-olefin is usually from 0.5 to 50 wt % based on the total weight (100 wt %) of the ethylene-α-olefin copolymer.

Besides the repeating units derived from ethylene and the α-olefin having 3 to 20 carbon atoms, the ethylene-α-olefin copolymer of the present invention may contain repeating units derived from other monomer in an amount such that the effects of the present invention are not deteriorated. Examples of the other monomer include conjugated dienes (e.g., butadiene and isoprene), non-conjugated dienes (e.g., 1,4-pentadiene), acrylic acid, acrylate esters (e.g., methyl acrylate and ethyl acrylate), methacrylic acid, methacrylate esters (e.g., methyl methacrylate and ethyl methacrylate), and vinyl acetate.

The ethylene-α-olefin copolymer of the present invention is preferably a copolymer having repeating units derived from ethylene and repeating units derived from an α-olefin having 4 to 20 carbon atoms, more preferably a copolymer having repeating units derived from ethylene and repeating units derived from an α-olefin having 5 to 20 carbon atoms, and further preferably a copolymer having repeating units derived from ethylene and repeating units derived from an α-olefin having 6 to 20 carbon atoms.

Specific examples of the ethylene-α-olefin copolymer of the present invention include ethylene-1-hexene copolymers, ethylene-4-methyl-1-pentene copolymers, ethylene-1-octene copolymers, ethylene-1-butene-1-hexene copolymers, ethylene-1-butene-4-methyl-1-pentene copolymers, ethylene-1-butene-1-octene copolymers, etc. Among them, ethylene-1-hexene copolymers, ethylene-4-methyl-1-pentene copolymers, ethylene-1-butene-1-hexene copolymers, ethylene-1-butene-4-methyl-1-pentene copolymers, ethylene-1-octene copolymers, ethylene-1-hexene-1-octene copolymers, and ethylene-1-butene-1-octene copolymers are preferably, and ethylene-1-hexene copolymers, ethylene-1-octene copolymers, ethylene-1-butene-1-hexene copolymers, and ethylene-1-butene-1-octene copolymers are more preferable.

The melt flow rate (MFR; unit: g/10 min.) of the ethylene-α-olefin copolymer of the present invention is usually in a range from 0.01 to 100 g/10 min. The melt flow rate is preferably at least 0.05 g/10 min., more preferably at least 0.1 g/10 min., from the viewpoint of enhancing molding processability, particularly from the viewpoint of reducing an extrusion load. The melt flow rate is preferably 20 g/10 min. or less, more preferably 10 g/10 min. or less, and further preferably 6 g/10 min. or less, from the viewpoint of enhancing melt tension and mechanical strength of molded articles. The melt flow rate is measured at a temperature of 190° C. under a load of 21.18 N by method A according to the prescription of JIS K7210-1995. An antioxidant is blended with the ethylene-α-olefin copolymer in a proportion of about 1,000 ppm in advance for measuring the melt flow rate.

The density (d; unit: kg/m$^3$) of the ethylene-α-olefin copolymer of the present invention is usually in the range form 890 to 970 kg/m$^3$. The density is preferably at least 900 kg/m$^3$, and more preferably at least 905 kg/m$^3$, further preferably at least 910 kg/m$^3$ from the viewpoint of reducing fuming in melt processing. The density is preferably 940 kg/m$^3$ or less, more preferably 930 kg/m$^3$ or less, and particularly 925 kg/m$^3$ or less from the viewpoint of enhancing the impact resistant strength of the molded article obtained. The density is measured according to JIS K7112-1980 after annealing a sample according to JIS K6760-1995.

The ethylene-α-olefin copolymer of the present invention has branched long chains and excellent molding processability. Such an ethylene-α-olefin copolymer has a higher flow activation energy (Ea; unit: kJ/mol) than conventional linear ethylene-α-olefin copolymers. The conventional linear ethylene-α-olefin copolymers may not be satisfactory in molding processability, particularly in extrusion load, since Ea of the conventional copolymers is lower than 50 kJ/mol.

Ea of the ethylene-α-olefin copolymer of the present invention is preferably at least 55 kJ/mol, more preferably at least 60 kJ/mol, from the viewpoint of enhancing molding processability, particularly reducing an extrusion load without excessively reducing melt tension. Ea is preferably 100 kJ/mol or less, preferably 90 kJ/mol or less, from the viewpoint of enhancing the surface gloss of the molded article obtained.

The flow activation energy (Ea) is calculated as follows by the Arrhenius' equation from a shift factor ($a_T$) obtained when a master curve that shows angular frequency (unit: rad/sec) dependency of a melt complex viscosity (unit: Pa·sec) at 190° C. is depicted, based on a temperature-time superposition principle. That is, the shift factor ($a_T$) at each temperature (T) is determined by superposing a melt complex viscosity-angular frequency curve (melt complex viscosity in Pa·sec; angular frequency in rad/sec) of the ethylene-α-olefin copolymer at each temperature (T; unit: ° C.) of 130° C., 150° C., 170° C. and 190° C. on the melt complex viscosity-angular frequency curve of the ethylene copolymer at 190° C. for every melt complex viscosity-angular frequency curves at corresponding temperatures (T) based on the temperature-time superposition principle. A primary approximate formula (equation (I) below) between [ln($a_T$)] and [1/(T+273.16] is calculated by the least square method from each temperature (T) and shift factor ($a_T$) at the temperature. Then, Ea is determined from the slope (m) of Equation (I) and Equation (II):

$$\ln(a_T) = m(1/(T+273.16)) + n \quad (I)$$

$$Ea = |0.008314 \times m| \quad (II)$$

$a_T$: shift factor
Ea: flow activation energy (unit: kJ/mol)
T: temperature (unit: ° C.)

A commercially available calculation software may be used for the above-mentioned calculation, and an example of the calculation software is Rhios V.4.4.4 (available form Rheometrics).

The shift factor ($a_T$) is an amount of a shift, when a double logarithmic curve of the melt complex viscosity-angular frequency at each temperature (T) is made to move in the direction of log(Y)=-log(X) axis (provided that the Y axis represents the melt complex viscosity and the X axis represents an angular frequency) and is superposed on the melt complex viscosity-angular frequency curve at 190° C. The angular frequency is made to shift $a_T$ times and the melt complex viscosity is made to shift 1/$a_T$ times for every melt complex viscosity-angular frequency at each temperature (T) for superposition. The correlation factor for determining Equation (I) from the values of four points of 130° C., 150° C., 170° C. and 190° C. by the least square method is usually at least 0.99.

The melt complex viscosity-angular frequency curve is measured using a viscoelastometer (e.g., Rheometrics Mechanical Spectrometer RMS-800 manufactured by Rheometrics) under the following conditions: the geometry of parallel plates, a plate diameter of 25 mm, a plate distance of 1.5 to 2 mm, a strain of 5% and an angular frequency of 0.1 to 100 rad/sec. The measurement is preformed in a nitrogen atmosphere, and an antioxidant is preferably compounded in a suitable amount (for example, 1,000 ppm) with the measuring sample in advance.

The molecular weight distribution (Mw/Mn) of the ethylene-α-olefin copolymer of the present invention is preferably at least 3, more preferably at least 5 and further preferably at least 6, from the viewpoint of enhancing molding processability, particularly from the viewpoint of reducing an extrusion load. The molecular weight distribution is preferably 25 or less, more preferably 20 or less, and further preferably 15 or less from the viewpoint of enhancing the mechanical strength of the molded article obtained. The molecular weight distribution (Mw/Mn) is a value obtained by measuring a weight average molecular weight (Mw) and a number average molecular weight (Mn) by gel permeation chromatography (GPC) and dividing Mw by Mn. The typical conditions for measuring GPC are as follows:

(1) apparatus: Waters 150C manufactured by Waters;
(2) separation column: TOSOH TSKgel GMH6-HT;
(3) measuring temperature; 140° C.;
(4) carrier: o-dichlorobenzene;
(5) flow rate: 1.0 mL/min;
(6) injection volume: 500 μL;
(7) detector: differential refractometer; and
(8) molecular weight standard substance: standard polystyrene.

The hexane extraction rate C (unit: wt %) of the ethylene-α-olefin copolymer of the present invention is usually 2.8% or less. The hexane extraction rate C of the present invention is preferably 2.7% or less, more preferably 2.6% or less from the viewpoint of reducing fuming in melt processing, and is preferably at least 0.5%, more preferably at least 0.8%, and further preferably at least 1.0% from the viewpoint of enhancing molding processability.

The hexane extraction rate C is measured as follows.

(1) The ethylene-α-olefin copolymer is formed into a film having a thickness of 100 μm using a hot-press at 150° C., and about 1 g of a sample piece cut from the film is placed in a flask.
(2) n-Hexane (400 mL) is added to the sample in the flask, and is stirred at 50° C. for 2 hours while heating.
(3) After stirring while heating, the sample insoluble in n-hexane is removed by filtration.
(4) n-Hexane is evaporated off from the filtrate recovered by filtration, and a dried residue is obtained by vacuum drying for 2 hours,
(5) The hexane extraction rate C is calculated form the following equation using the weight of the sample sampled in the flask and the weight of the dried residue obtained from the filtrate:

$$C = 100 \times [\text{weight of dried residue (g)/weight of sample (g)}]$$

The melt flow rate ratio (MFRR) of the ethylene-α-olefin copolymer of the present invention is preferably at least 60 from the viewpoint of enhancing molding processability, particularly from the viewpoint of decreasing extrusion load. The melt flow rate (MFR-H; unit: g/10 min.) is measured under a test load of 211.82 N and a measurement temperature of 190° C. according to JIS K7210-1995, and MFRR is calculated by dividing MFR-H by the melt flow rate (MFR) measured under a load of 21.18N at 190° C. according to JIS K7210-1995. An antioxidant (about 1000 ppm) is usually added to the copolymer in advance for measuring the melt flow rate.

The ethylene-α-olefin copolymer of the present invention preferably has a large maximum take-up velocity (unit: m/min.), which is measured by a method described below, from the viewpoint of enhancing high speed processability:

Measurement of Maximum Take-up Velocity:

Using a melt tension tester (manufactured by Toyo Seiki Seisakusho Ltd.), a molten resin charged in a barrel having a diameter of 9.5 mm is extruded at a specific temperature through an orifice having a diameter of 2.09 mm and a length of 8 mm at a piston lowering rate of 5.5 mm/min. (shear rate of 7.4 sec$^{-1}$). Then, the extruded molten resin is taken up around a take-up roll having a diameter of 50 mm with increasing a take-up velocity at a rate of 40 rpm/min. A take-up velocity just before the molten resin is broken is the maximum take-up velocity at the specific temperature. The maximum take-up velocity at 150° C. is expressed a $MTV_{150}$ and the maximum take-up velocity at 190° C. is expressed a $MTV_{190}$.

$MTV_{150}$ is preferably at least 15 m/min., more preferably at least 20 m/min., and $MTV_{190}$ is preferably at least 5 m/min., more preferably at least 8 m/min.

The MTV of the ethylene-α-olefin copolymer of the present invention may be tailored by adjusting the amount of hydrogen. When the amount of hydrogen is decreased, the MTV of the ethylene-α-olefin copolymer tends to decrease, and vice versa.

The ethylene-α-olefin copolymer of the present invention preferably has a large melt tension (unit: cN), which is measured by a method described below, from the viewpoint of enhancing molding processability:

Measurement of Melt Tension:

Using a melt tension tester (manufactured by Toyo Seiki Seisakusho Ltd.), a molten resin charged in a barrel having a diameter of 9.5 mm is extruded at a specific temperature through an orifice having a diameter of 2.09 mm and a length of 8 mm at a piston lowering rate of 5.5 mm/min. (shear rate of 7.4 sec$^{-1}$). Then, the extruded molten resin is taken up around a take-up roll having a diameter of 50 mm with increasing a take-up velocity at a rate of 40 rpm/min. A melt tension just before the molten resin is broken is the melt tension at the specific temperature. The melt tension at 150° C. is expressed a $MT_{150}$ and the melt tension at 190° C. is expressed a $MT_{190}$.

$MT_{150}$ is preferably at least 5 cN, more preferably at least 7 cN, further preferably at least 8 cN, particularly preferably at least 9 cN, and $MT_{190}$ is preferably at least 3.5 cN, more preferably at least 4 cN, further preferably at least 5 cN, particularly preferably at least 6 cN.

The MT of the ethylene-α-olefin copolymer of the present invention may be tailored by adjusting the amount of hydrogen. When the amount of hydrogen is decreased, the MT of the ethylene-α-olefin copolymer tends to increase, and vice versa.

The ethylene-α-olefin copolymer of the present invention is prepared by copolymerizing ethylene and an α-olefin using a metallocene-base olefin polymerization catalyst which is prepared by allowing a metallocene complex to contact a solid co-catalyst component formed by supporting an activated co-catalyst component (hereinafter referred to as co-catalyst component (I)) on a fine granular carrier.

Examples of the co-catalyst component (I) include zinc compounds. A specific example of the zinc compound as the co-catalyst component (I) is a contact treatment product obtained by a contact treatment of diethyl zinc, fluorinated phenol and water.

A porous substance is preferably used as the fine granular carrier, and examples of the carrier available include inorganic oxides such as $SiO_2$, $Al_2O_3$, MgO, $ZrO_2$, $TiO_2$, $B_2O_3$, CaO, ZnO, BaO and $ThO_2$; clays and clay minerals such as smectite, montmorillonite, hectorite, laponite and saponite; and organic polymers such as polyethylene, polypropylene and styrene-divinylbenzene copolymer. The 50% volume average particle diameter of the fine granular carrier is usually from 10 to 500 μm, which is measured by a light scattering laser diffraction method. The pore volume of the pores of the fine granular carrier is usually from 0.3 to 10 ml/g, and the specific surface area of the fine granular carrier is usually from 10 to 1,000 m$^2$/g. The pore volume and specific surface area are measured by a gas adsorption method, that is, the fine pore volume and specific surface area are determined by analyzing the amount of gas adsorption by the BJH method and the BET method, respectively.

The metallocene complex is preferably a transition metal compound represented by the formula (I) below, or a μ-oxo type transition metal compound dimer thereof:

$$L^2{}_aM^2X^1{}_b \qquad (1)$$

wherein $M^2$ represents a transition metal selected from Groups 3 to 11 transition metals and lanthanoid series transition metals of the periodic table; $L^2$ is a group having a cyclopentadiene-form anion structure, and plural $L^2$ may be directly bonded to one another or via a bridging group comprising a carbon atom, a silicon atom, a nitrogen atom, an oxygen atom, a sulfur atom or a phosphorous atom; $X^1$ represents a halogen atom, a hydrocarbon group (except a group having a cyclopentadiene-form anion structure) or a hydrocarbyloxy group; a is a number satisfying the relationship: 0<a≦8, and b represents a number satisfying the relationship: 0<b≦8.

$M^2$ in formula (I) represents a transition metal selected from Groups 3 to 11 transition metal and lanthanolide transition metals of the periodic table (IUPAC 1989). Specific examples thereof include scandium atom, yttrium atom, titanium atom, zirconium atom, hafnium atom, vanadium atom, niobium atom, tantalum atom, chromium atom, iron atom, ruthenium atom, cobalt atom, rhodium atom, nickel atom, palladium atom, samarium atom and ytterbium atom. $M^2$ in the formula (1) is preferably titanium atom, zirconium atom, hafnium atom, vanadium atom, chromium atom, iron atom, cobalt atom or nickel atom, particularly titanium atom, zirconium atom or hafnium atom, and most preferably zirconium atom.

$L^2$ in the formula (1) is a group having a cyclopentadiene-form anion structure, and plural $L^2$ may be the same or different. The plural $L^2$ may be directly bonded to one another, or via a bridging group comprising a carbon atom, a silicon atom, a nitrogen atom, an oxygen atom, a sulfur atom or a phosphorous atom.

Examples of the group having a cyclopentadiene anion structure for $L^2$ include a η$^5$-(substituted)cyclopentadienyl group, a η$^5$-(substituted)indenyl group, a η$^5$-(substituted) fluorenyl group, etc. Specific examples of such groups include a η$^5$-cyclopentadienyl group, a η$^5$-methylcyclopentadienyl group, a η$^5$-ethylcyclopentadienyl group, a η$^5$-n-butylcyclopentadienyl group, a η$^5$-tert-butylcyclopentadienyl group, a η$^5$-1,2-dimethylcyclopentadienyl group, a η$^5$-1,3-dimethylcyclopentadienyl group, a η$^5$-1-methyl-2-ethylcyclopentadienyl group, a η$^5$-1-methyl-3-ethylcyclopentadienyl group, a η$^5$-1-tert-butyl-2-methylcyclopentadienyl group, a η$^5$-1-tert-butyl-3-methylcyclopentadienyl group, a η$^5$-1-methyl-2-isopropylcyclopentadienyl group, a η$^5$-1-methyl-3-isopropylcyclopentadienyl group, a η$^5$-1-methyl-2-n-butylcyclopentadienyl group, a η$^5$-1-methyl-3-n-butylcyclopentadienyl group, a η$^5$-1,2,3-trimethylcyclopentadienyl group, a η$^5$-1,2,4-trimethylcyclopentadienyl group, a η$^5$-tetramethylcyclopentadienyl group, a η$^5$-pentamethylcyclopentadienyl group, a η$^5$-indenyl group, a η$^5$-4,5,6,7-tetrahydroindenyl group, a η⁵-2-methylindenyl group, a η⁵-3-methylindenyl group, a η⁵-4-methyl indenyl group, a η⁵-5-methylindenyl group, a η⁵-6-methylindenyl group, a η⁵-7-methylindenyl group, a η⁵-2-tert-butylindenyl group, a η⁵-3-tert-butylindenyl group, a η⁵-4-tert-butylindenyl group, a η⁵-5-tert-butylindenyl group, a η⁵-6-tert-butylindenyl group, a η⁵-7-tert-butylindenyl group, a η⁵-2,3-dimethylindenyl group, a η⁵-4,7-dimethylindenyl group, a η⁵-2,4,7-trimethylindenyl group, a η⁵-2-methyl-4-isopropylindenyl group, a η⁵-4,5-benzindenyl group, a η⁵-2-methyl-4,5-benzindenyl group, a η⁵-4-phenylindenyl group, a η⁵-2-methyl-5-phenylindenyl group, a η⁵-2-methyl-4-phenylindenyl group, a η⁵-2-methyl-4-naphthylindenyl group, a η⁵-fluorenyl group, a η⁵-2,7-dimethylfluorenyl group, a η⁵-2,7-di-tert-butylfluorenyl group, and their substituted derivatives. Herein, "η⁵-" may sometimes be omitted from the nomenclatures of the transition metal compounds.

The groups having the cyclopentadiene anion structure may be bonded directly to each other, or via a bridge group comprising a carbon atom, a silicon atom, a nitrogen atom, an oxygen atom a sulfur atom or a phosphorus atom. Examples of such a bridge group include an alkylene group such as an ethylene group, a propylene group, etc.; a substituted alkylene groups such as a dimethylmethylene group, a diphenylmethylene group, etc.; a silylene group or a substituted silylene group such as a dimethylsilylene group, diphenylsilylene group, tetramethyldisilylene group, etc.; and a heteroatom such as a nitrogen atom, an oxygen atom, a sulfur atom, a phosphorus atom, etc.

Substituent $X^1$ in the general formula [1] is a halogen atom, a hydrocarbon group (excluding a group having a cyclopentadiene anion structure), or a hydrocarbyloxy group. Examples of the halogen atom are a fluorine atom, a chlorine atom, a bromine atom and iodine atom. The hydrocarbon group herein used does not include any group having cyclopentadiene anion structure. Examples of the hydrocarbon group used herein include alkyl groups, aralkyl groups, aryl groups, alkenyl groups, etc. and examples of the hydrocarbyloxy group include alkoxy groups, aralkyloxy groups, aryloxy groups, etc.

Specific examples of the alkyl group include a methyl group, an ethyl group, a n-propyl group, an isopropyl group, a n-butyl group, a sec-butyl group, a tert-butyl group, an isobutyl group, a n-pentyl group, a neopentyl group, an amyl group, a n-hexyl group, a n-octyl group, a n-decyl group, a n-dodecyl group, a n-pentadecyl group, a n-eicosyl group, etc. These alkyl groups may be substituted with a halogen atom such as a fluorine atom, a chlorine atom, a bromine atom or an iodine atom. Specific examples of the halogen-substituted alkyl groups include a fluoromethyl group, a trifluoromethyl group, a chloromethyl group, a trichloromethyl group, a fluoroethyl group, a pentafluoroethyl group, a perfluoropropyl group, a perfluorobutyl group, a perfluorohexyl group, a perfluorooctyl group, a perchloropropyl group, a perchlorobutyl group, a perbromopropyl group, etc. Those alkyl groups or halogen-substituted alkyl groups may partly be substituted with an alkoxy group such as a methoxy group, an ethoxy group, etc.; an aryloxy group such as a phenoxy group, etc.; or an aralkyloxy group such as a benzyloxy group, etc.

Specific examples of the aralkyl group include a benzyl group, a (2-methylphenyl)methyl group, a (3-methylphenyl)methyl group, a (4-methylphenyl)methyl group, a (2,3-dimethylphenyl)methyl group, a (2,4-dimethylphenyl)methyl group, a (2,5-dimethylphenyl)methyl group, a (2,6-dimethylphenyl)methyl group, a (3,4-dimethylphenyl)methyl group, a (3,5-dimethylphenyl)methyl group, a (2,3,4-trimethylphenyl)methyl group, a (2,3,5-trimethylphenyl)methyl group, a (2,3,6-trimethylphenyl)methyl group, a (3,4,5-trimethylphenyl)methyl group, a (2,4,6-trimethylphenyl)methyl group, a (2,3,4,5-tetramethylphenyl)methyl group, a (2,3,4,6-tetramethylphenyl)methyl group, a (2,3,5,6-tetramethylphenyl)methyl group, a (pentamethylphenyl)methyl group, an (ethylphenyl)methyl group, a (n-propylphenyl)methyl group, an (isopropylphenyl)methyl group, a (n-butylphenyl)methyl group, a (sec-butylphenyl)methyl group, a (tert-butylphenyl)methyl group, a (n-pentylphenyl)methyl group, a (neopentylphenyl)methyl group, a (n-hexylphenyl)methyl group, a (n-octylphenyl)methyl group, a (n-decylphenyl)methyl group, a (n-dodecylphenyl)methyl group, a naphthylmethyl group, an anthracenylmethyl group, etc. Those aralkyl groups may partly be substituted with a halogen atom such as a fluorine atom, a chlorine atom, a bromine atom or an iodine atom; an alkoxy group such as a methoxy group, an ethoxy group, etc.; an aryloxy group such as a phenoxy group, etc.; or an aralkyloxy group such as a benzyloxy group, etc.

Specific examples of the aryl group include a phenyl group, a 2-tolyl group, a 3-tolyl group, a 4-tolyl group, a 2,3-xylyl group, a 2,4-xylyl group, a 2,5-xylyl group, a 2,6-xylyl group, a 3,4-xylyl group, a 3,5-xylyl group, a 2,3,4-trimethylphenyl group, a 2,3,5-trimethylphenyl group, a 2,3,6-trimethylphenyl group, a 2,4,6-trimethylphenyl group, a 3,4,5-trimethylphenyl group, a 2,3,4,5-tetramethylphenyl group, a 2,3,4,6-tetramethylphenyl group, a 2,3,5,6-tetramethylphenyl group, a pentamethylphenyl group, an ethylphenyl group, a n-propylphenyl group, an isopropylphenyl group, a n-butylphenyl group, a sec-butylphenyl group, a tert-butylphenyl group, a n-pentylphenyl group, a neopentylphenyl group, a n-hexylphenyl group, a n-octylphenyl group, a n-decylphenyl group, a n-dodecylphenyl group, a n-tetradecylphenyl group, a naphthyl group, an anthracenyl, etc. Those aryl groups may partly be substituted with a halogen atom such as a fluorine atom, a chlorine atom, a bromine atom or an iodine atom; an alkoxy group such as a methoxy group, an ethoxy group, etc.; an aryloxy group such as a phenoxy group, etc.; or an aralkyloxy group such as a benzyloxy group, etc.

Specific examples of the alkenyl group include an ally group, a methallyl group, a crotyl group, a 1,3-diphenyl-2-propenyl group, etc.

Specific examples of the alkoxy group include a methoxy group, an ethoxy group, a n-propoxy group, an isopropoxy group, a n-butoxy group, a sec-butoxy group, a tert-butoxy group, a n-pentoxy group, a neopentoxy group, a n-hexoxy group, a n-oxtoxy group, a n-dodecoxy group, a n-pentadecoxy group, a n-icosoxy group, etc. Those alkoxy groups may partly be substituted with a halogen atom such as a fluorine atom, a chlorine atom, a bromine atom or an iodine atom; an alkoxy group such as a methoxy group, an ethoxy group, etc.; an aryloxy group such as a phenoxy group, etc.; or an aralkyloxy group such as a benzyloxy group, etc.

Specific examples of the aralkyloxy group include a benzyloxy group, a (2-methylphenyl)methoxy group, a (3-methylphenyl)methoxy group, a (4-methylphenyl)methoxy group, a (2,3-dimethylphenyl)methoxy group, a (2,4-dimethylphenyl)methoxy group, a (2,5-dimethylphenyl)methoxy group, a (2,6-dimethylphenyl)methoxy group, a (3,4-dimethylphenyl)methoxy group, a (3,5-dimethylphenyl)methoxy group, a (2,3,4-trimethylphenyl)methoxy group, a (2,3,5-trimethylphenyl)methoxy group, a (2,3,6-trimethylphenyl)methoxy group, a (2,4,5-trimethylphenyl)methoxy group, a (2,4,6-trimethylphenyl)methoxy group, a (3,4,5-trimethylphenyl)methoxy group, a (2,3,4,5-tetramethylphenyl)methoxy group, a (2,3,4,6-tetramethylphenyl)methoxy group, a (2,3,5,6-tetramethylphenyl)methoxy group, a (pentamethylphenyl)methoxy group, an (ethylphenyl)methoxy group, a (n-propylphenyl)methoxy group, an (isopropylphenyl)methoxy group, a (n-butylphenyl)methoxy group, a (sec-butylphenyl)methoxy group, a (tert-butylphenyl)methoxy group, a (n-hexylphenyl)methoxy group, a (n-octylphenyl) methoxy group, a (n-decylphenyl)methoxy group, a naphthylmethoxy group, an anthracenylmethoxy group, etc. These aralkyloxy groups may partly be substituted with a halogen atom such as a fluorine atom, a chlorine atom, a bromine atom or an iodine atom; an alkoxy group such as a methoxy group, an ethoxy group, etc.; an aryloxy group such as a phenoxy group, etc.; or an aralkyloxy group such as a benzyloxy group, etc.

Specific examples of the aryloxy group include a phenoxy group, a 2-methylphenoxy group, a 3-methylphenoxy group, a 4-methylphenoxy group, a 2,3-dimethylphenoxy group, a 2,4-dimethylphenoxy group, a 2,5-dimethylphenoxy group, a 2,6-dimethylphenoxy group, a 3,4-dimethylphenoxy group, a 3,5-dimethylphenoxy group, a 2-tert-butyl-3-methylphenoxy group, a 2-tert-butyl-4-methylphenoxy group, a 2-tert-butyl-5-methylphenoxy group, a 2-tert-butyl-6-methylphenoxy group, a 2,3,4-trimethylphenoxy group, a 2,3,5-trimethylphenoxy group, a 2,3,6-trimethylphenoxy group, a 2,4,5-trimethylphenoxy group, a 2,4,6-trimethylphenoxy group, a 2-tert-butyl-3,4-dimethylphenoxy group, a 2-tert-butyl-3,5-dimethylphenoxy group, a 2-tert-butyl-3,6-dimethylphenoxy group, a 2,6-di-tert-butyl-3-methylphenoxy group, a 2-tert-butyl-4,5-dimethylphenoxy group, a 2,6-di-tert-butyl-4-methylphenoxy group, a 3,4,5-trimethylphenoxy group, a 2,3,4,5-tetramethylphenoxy group, a 2-tert-butyl-3,4,5-trimethylphenoxy group, a 2,3,4,6-tetramethylphenoxy group, a 2-tert-butyl-3,4,6-trimethylphenoxy group, a 2,6-di-tert-butyl-3,4-dimethylphenoxy group, a 2,3,5,6-tetramethylphenoxy group, a 2-tert-butyl-3,5,6-trimethylphenoxy group, a 2,6-di-tert-butyl-3,5-dimethylphenoxy group, a pentamethylphenoxy group, an ethylphenoxy group, a n-propylphenoxy group, an isopropylphenoxy group, a n-butylphenoxy group, a sec-butylphenoxy group, a tert-butylphenoxy group, a n-hexylphenoxy group, a n-octylphenoxy group, a n-decylphenoxy group, a n-tetradecylphenoxy group, a naphthoxy group, an anthracenoxy group, etc. Those aryloxy groups may partly be substituted with a halogen atom such as a fluorine atom, a chlorine atom, a bromine atom or an iodine atom; an alkoxy group such as a methoxy group, an ethoxy group, etc.; an aryloxy group such as a phenoxy group, etc.; or an aralkyloxy group such as a benzyloxy group, etc.

In the general formula [1], suffix "a" is a number satisfying the relationship: 0<a≦8, suffix "b" is a number satisfying the relationship: 0<b≦8, and "a" and "b" are suitably selected depending on the valency of $M^2$. When $M^2$ is a titanium atom, a zirconium atom or a hafnium atom, "a" is preferably 2, and also "b" is preferably 2.

Specific examples of the metallocene complex include bis(cyclopentadienyl)titanium dichloride, bis(methylcyclopentadienyl)titanium dichloride, bis(ethylcyclopentadienyl)titanium dichloride, bis(n-butylcyclopentadienyl)titanium dichloride, bis(tert-butylcyclopentadienyl)titanium dichloride, bis(1,2-dimethylcyclopentadienyl)titanium dichloride, bis(1,3-dimethylcyclopentadienyl)titanium dichloride, bis(1-methyl-2-ethylcyclopentadienyl)titanium dichloride, bis(1-methyl-3-ethylcyclopentadienyl)titanium dichloride, bis(1-methyl-2-n-butylcyclopentadienyl)titanium dichloride, bis(1-methyl-3-n-butylcyclopentadienyl)titanium dichloride, bis(1-methyl-2-isopropylcyclopentadienyl)titanium dichloride, bis(1-methyl-3-isopropylcyclopentadienyl)titanium dichloride, bis(1-tert-butyl-2-methylcyclopentadienyl) titanium dichloride, bis(1-tert-butyl-3-methylcyclopentadienyl)titanium dichloride, bis(1,2,3-trimethylcyclopentadienyl)titanium dichloride, bis(1,2,4-trimethylcyclopentadienyl)titanium dichloride, bis(tetramethylcyclopentadienyl)titanium dichloride, bis(pentamethylcyclopentadienyl)titanium dichloride, bis(indenyl)titanium dichloride, bis(4,5,6,7-tetrahydroindenyl) titanium dichloride, bis(fluorenyl)titanium dichloride, bis(2-phenylindenyl)titanium dichloride, bis[2-(bis-3,5-trifluoromethylphenyl)indenyl]titanium dichloride, bis[2-(4-tert-butylphenyl)indenyl]titanium dichloride, bis[2-(4-trifluoromethylphenyl)indenyl]titanium dichloride, bis[2-(4-methylphenyl)indenyl]titanium dichloride, bis[2-(3,5-dimethylphenyl)indenyl]titanium dichloride, bis[2-(pentafluorophenyl)indenyl]titanium dichloride, cyclopentadienyl(pentamethylcyclopentadienyl)titanium dichloride, cyclopentadienyl(indenyl)titanium dichloride, cyclopentadienyl(fluorenyl)titanium dichloride, indenyl (fluorenyl)titanium dichloride, pentamethylcyclopentadienyl (indenyl)titanium dichloride, pentamethylcyclopentadienyl (fluorenyl)titanium dichloride, cyclopentadienyl(2-phenylindenyl)titanium dichloride, pentamethylcyclopentadienyl(2-phenylindenyl)titanium dichloride, dimethylsilylenebis(cyclopentadienyl)titanium dichloride, dimethylsilylenebis(2-methylcyclopentadienyl) titanium dichloride, dimethylsilylenebis(3-methylcyclopentadienyl)titanium dichloride, dimethylsilylenebis(2-n-butylcyclopentadienyl)titanium dichloride, dimethylsilylenebis(3-n-butylcyclopentadienyl)titanium dichloride, dimethylsilylenebis(2,3-dimethylcyclopentadienyl)titanium dichloride, dimethylsilylenebis(2,4-dimethylcyclopentadienyl)titanium dichloride, dimethylsilylenebis(2,5-dimethylcyclopentadienyl)titanium dichloride, dimethylsilylenebis(3,4-dimethylcyclopentadienyl)titanium dichloride, dimethylsilylenebis(2,3-ethylmethylcyclopentadienyl)titanium dichloride, dimethylsilylenebis(2,4-ethylmethylcyclopentadienyl)titanium dichloride, dimethylsilylenebis(2,5-ethylmethylcyclopentadienyl)titanium dichloride, dimethylsilylenebis(3,5-ethylmethylcyclopentadienyl)titanium dichloride, dimethylsilylenebis(2,3,4-trimethylcyclopentadienyl)titanium dichloride, dimethylsilylenebis(2,3,5-trimethylcyclopentadienyl)titanium dichloride, dimethylsilylenebis(tetramethylcyclopentadienyl)titanium dichloride, dimethylsilylenebis(indenyl)titanium dichloride, dimethylsilylenebis(2-methylindenyl)titanium dichloride, dimethylsilylenebis(2-tert-butylindenyl)titanium dichloride, dimethylsilylenebis(2,3-dimethylindenyl)titanium dichloride, dimethylsilylenebis(2,4,7-trimethylindenyl)titanium dichloride, dimethylsilylenebis(2-methyl-4-isopropylindenyl)titanium dichloride, dimethylsilylenebis(4,5-benzindenyl)titanium dichloride, dimethylsilylenebis(2-methyl-4,5-benzindenyl)titanium dichloride, dimethylsilylenebis(2-phenylindenyl)titanium dichloride, dimethylsilylenebis(4-phenylindenyl)titanium dichloride, dimethylsilylenebis(2-methyl-4-phenylindenyl)titanium dichloride, dimethylsilylenebis(2-methyl-5-phenylindenyl)titanium dichloride, dimethylsilylenebis(2-methyl-4-naphthylindenyl)titanium dichloride, dimethylsilylenebis(4,5,6,7-tetrahydroindenyl)titanium dichloride, dimethylsilylene(cyclopentadienyl)(indenyl)titanium dichloride, dimethylsilylene (methylcyclopentadienyl)(indenyl)titanium dichloride, dimethylsilylene(n-butylcyclopentadienyl)(indenyl)titanium dichloride, dimethylsilylene(tetramethylcyclopentadienyl) (indenyl)titanium dichloride, dimethylsilylene(cyclopentadienyl)(fluorenyl)titanium dichloride, dimethylsilylene(methylcyclopentadienyl)(fluorenyl)titanium dichloride, dimethylsilylene(n-butylcyclopentadienyl)(fluorenyl)titanium dichloride, dimethylsilylene(tetramethylcyclopentadienyl)(indenyl)titanium dichloride, dimethylsilylene(indenyl)

(fluorenyl)titanium dichloride, dimethylsilylenebis(fluorenyl)titanium dichloride, dimethylsilylene(cyclopentadienyl)(tetramethylcyclopentadienyl)titanium dichloride, dimethylsilylene(tetramethylcyclopentadienyl)(fluorenyl)titanium dichloride, cyclopentadienyltitanium trichloride, pentamethylcyclopentadienyltitanium trichloride, cyclopentadienyl(dimethylamino)titanium dichloride, cyclopentadienyl(phenoxy)titanium dichloride, cyclopentadienyl(2,6-dimethylphenyl)titanium dichloride, cyclopentadienyl(2,6-diisopropylphenyl)titanium dichloride, cyclopentadienyl(2,6-di-tert-butylphenyl)titanium dichloride, pentamethylcyclopentadienyl(2,6-dimethylphenyl)titanium dichloride, pentamethylcyclopentadienyl(2,6-diisopropylphenyl)titanium dichloride, pentamethylcyclopentadienyl(2,6-tert-butylphenyl)titanium dichloride, indenyl(2,6-diisopropylphenyl)titanium dichloride, fluorenyl(2,6-diisopropylphenyl)titanium dichloride, dimethylsilylene(cyclopentadienyl)(2-phenoxy)titanium dichloride, dimethylsilylene(cyclopentadienyl)(3-methyl-2-phenoxy)titanium dichloride, dimethylsilylene(cyclopentadienyl)(3,5-dimethyl-2-phenoxy)titanium dichloride, dimethylsilylene(cyclopentadienyl)(3-tert-butyl-2-phenoxy)titanium dichloride, dimethylsilylene(cyclopentadienyl)(3-tert-butyl-5-methyl-2-phenoxy)titanium dichloride, dimethylsilylene(cyclopentadienyl)(3,5-di-tert-butyl-2-phenoxy)titanium dichloride, dimethylsilylene(cyclopentadienyl)(5-methyl-3-phenyl-2-phenoxy)titanium dichloride, dimethylsilylene(cyclopentadienyl)(3-tert-butyldimethylsilyl-5-methyl-2-phenoxy)titanium dichloride, dimethylsilylene(cyclopentadienyl)(5-methyl-3-trimethylsilyl-2-phenoxy)titanium dichloride, dimethylsilylene(cyclopentadienyl)(3-tert-butyl-5-methoxy-2-phenoxy)titanium dichloride, dimethylsilylene(cyclopentadienyl)(3-tert-butyl-5-chloro-2-phenoxy)titanium dichloride, dimethylsilylene(cyclopentadienyl)(3,5-diamyl-2-phenoxy)titanium dichloride, dimethylsilylene(cyclopentadienyl)(3-phenyl-2-phenoxy)titanium dichloride, dimethylsilylene(cyclopentadienyl)(1-naphthox-2-yl)titanium dichloride, dimethylsilylene(methylcyclopentadienyl)(2-phenoxy)titanium dichloride, dimethylsilylene(methylcyclopentadienyl)(3-methyl-2-phenoxy)titanium dichloride, dimethylsilylene(methylcyclopentadienyl)(3,5-dimethyl-2-phenoxy)titanium dichloride, dimethylsilylene(methylcyclopentadienyl)(3-tert-butyl-2-phenoxy)titanium dichloride, dimethylsilylene(methylcyclopentadienyl)(3-tert-butyl-5-methyl-2-phenoxy)titanium dichloride, dimethylsilylene(methylcyclopentadienyl)(3,5-di-tert-butyl-2-phenoxy)titanium dichloride, dimethylsilylene(methylcyclopentadienyl)(5-methyl-3-phenyl-2-phenoxy)titanium dichloride, dimethylsilylene(methylcyclopentadienyl)(3-tert-butyldimethylsilyl-5-methyl-2-phenoxy)titanium dichloride, dimethylsilylene(methylcyclopentadienyl)(5-methyl-3-trimethylsilyl-2-phenoxy)titanium dichloride, dimethylsilylene(methylcyclopentadienyl)(3-tert-butyl-5-methoxy-2-phenoxy)titanium dichloride, dimethylsilylene(methylcyclopentadienyl)(3-tert-butyl-5-chloro-2-phenoxy)titanium dichloride, dimethylsilylene(methylcyclopentadienyl)(3,5-diamyl-2-phenoxy)titanium dichloride, dimethylsilylene(methylcyclopentadienyl)(3-phenyl-2-phenoxy)titanium dichloride, dimethylsilylene(methylcyclopentadienyl)(1-naphthox-2-yl)titanium dichloride, dimethylsilylene(n-butylcyclopentadienyl)(2-phenoxy)titanium dichloride, dimethylsilylene(n-butylcyclopentadienyl)(3-methyl-2-phenoxy)titanium dichloride, dimethylsilylene(n-butylcyclopentadienyl)(3,5-dimethyl-2-phenoxy)titanium dichloride, dimethylsilylene(n-butylcyclopentadienyl)(3-tert-butyl-2-phenoxy)titanium dichloride, dimethylsilylene(n-butylcyclopentadienyl)(3-tert-butyl-5-methyl-2-phenoxy)titanium dichloride, dimethylsilylene(n-butylcyclopentadienyl)(3,5-di-tert-butyl-2-phenoxy)titanium dichloride, dimethylsilylene(n-butylcyclopentadienyl)(5-methyl-3-phenyl-2-phenoxy)titanium dichloride, dimethylsilylene(n-butylcyclopentadienyl)(3-tert-butyldimethylsilyl-5-methyl-2-phenoxy)titanium dichloride, dimethylsilylene(n-butylcyclopentadienyl)(5-methyl-3-trimethylsilyl-2-phenoxy)titanium dichloride, dimethylsilylene(n-butylcyclopentadienyl)(3-tert-butyl-5-methoxy-2-phenoxy)titanium dichloride, dimethylsilylene(n-butylcyclopentadienyl)(3-tert-butyl-5-chloro-2-phenoxy)titanium dichloride, dimethylsilylene(n-butylcyclopentadienyl)(3,5-diamyl-2-phenoxy)titanium dichloride, dimethylsilylene(n-butylcyclopentadienyl)(3-phenyl-2-phenoxy)titanium dichloride, dimethylsilylene(n-butylcyclopentadienyl)(1-naphthox-2-yl)titanium dichloride, dimethylsilylene(tert-butylcyclopentadienyl)(2-phenoxy)titanium dichloride, dimethylsilylene(tert-butylcyclopentadienyl)(3-methyl-2-phenoxy)titanium dichloride, dimethylsilylene(tert-butylcyclopentadienyl)(3,5-dimethyl-2-phenoxy)titanium dichloride, dimethylsilylene(tert-butylcyclopentadienyl)(3-tert-butyl-2-phenoxy)titanium dichloride, dimethylsilylene(tert-butylcyclopentadienyl)(3-tert-butyl-5-methyl-2-phenoxy)titanium dichloride, dimethylsilylene(tert-butylcyclopentadienyl)(3,5-di-tert-butyl-2-phenoxy)titanium dichloride, dimethylsilylene(tert-butylcyclopentadienyl)(5-methyl-3-phenyl-2-phenoxy)titanium dichloride, dimethylsilylene(tert-butylcyclopentadienyl)(3-tert-butyldimethylsilyl-5-methyl-2-phenoxy)titanium dichloride, dimethylsilylene(tert-butylcyclopentadienyl)(5-methyl-3-trimethylsilyl-2-phenoxy)titanium dichloride, dimethylsilylene(tert-butylcyclopentadienyl)(3-tert-butyl-5-methoxy-2-phenoxy)titanium dichloride, dimethylsilylene(tert-butylcyclopentadienyl)(3-tert-butyl-5-chloro-2-phenoxy)titanium dichloride, dimethylsilylene(tert-butylcyclopentadienyl)(3,5-diamyl-2-phenoxy)titanium dichloride, dimethylsilylene(tert-butylcyclopentadienyl)(3-phenyl-2-phenoxy)titanium dichloride, dimethylsilylene(tert-butylcyclopentadienyl)(1-naphthox-2-yl)titanium dichloride, dimethylsilylene(tetramethylcyclopentadienyl)(2-phenoxy)titanium dichloride, dimethylsilylene(tetramethylcyclopentadienyl)(3-methyl-2-phenoxy)titanium dichloride, dimethylsilylene(tetramethylcyclopentadienyl)(3,5-dimethyl-2-phenoxy)titanium dichloride, dimethylsilylene(tetramethylcyclopentadienyl)(3-tert-butyl-2-phenoxy)titanium dichloride, dimethylsilylene(tetramethylcyclopentadienyl)(3-tert-butyl-5-methyl-2-phenoxy)titanium dichloride, dimethylsilylene(tetramethylcyclopentadienyl)(3,5-di-tert-butyl-2-phenoxy)titanium dichloride, dimethylsilylene(tetramethylcyclopentadienyl)(5-methyl-3-phenyl-2-phenoxy)titanium dichloride, dimethylsilylene(tetramethylcyclopentadienyl)(3-tert-butyldimethylsilyl-5-methyl-2-phenoxy)titanium dichloride, dimethylsilylene(tetramethylcyclopentadienyl)(5-methyl-3-trimethylsilyl-2-phenoxy)titanium dichloride, dimethylsilylene(tetramethylcyclopentadienyl)(3-tert-butyl-5-methoxy-2-phenoxy)titanium dichloride, dimethylsilylene(tetramethylcyclopentadienyl)(3-tert-butyl-5-chloro-2-phenoxy)titanium dichloride, dimethylsilylene(tetramethylcyclopentadienyl)(3,5-diamyl-2-phenoxy)titanium dichloride, dimethylsilylene(tetramethylcyclopentadienyl)(3-phenyl-2-phenoxy)

titanium dichloride, dimethylsilylene(tetramethylcyclopentadienyl)(1-naphthox-2-yl)titanium dichloride, dimethylsilylene(trimethylsilylcyclopentadienyl)(2-phenoxy)titanium dichloride, dimethylsilylene(trimethylsilylcyclopentadienyl)(3-methyl-2-phenoxy)titanium dichloride, dimethylsilylene(trimethylsilylcyclopentadienyl)(3,5-dimethyl-2-phenoxy)titanium dichloride, dimethylsilylene(trimethylsilylcyclopentadienyl)(3-tert-butyl-2-phenoxy)titanium dichloride, dimethylsilylene(trimethylsilylcyclopentadienyl)(3-tert-butyl-5-methyl-2-phenoxy)titanium dichloride, dimethylsilylene(trimethylsilylcyclopentadienyl)(3,5-di-tert-butyl-2-phenoxy)titanium dichloride, dimethylsilylene(trimethylsilylcyclopentadienyl)(5-methyl-3-phenyl-2-phenoxy)titanium dichloride, dimethylsilylene(trimethylsilylcyclopentadienyl)(3-tert-butyldimethylsilyl-5-methyl-2-phenoxy)titanium dichloride, dimethylsilylene(trimethylsilylcyclopentadienyl)(5-methyl-3-trimethylsilyl-2-phenoxy)titanium dichloride, dimethylsilylene(trimethylsilylcyclopentadienyl)(3-tert-butyl-5-methoxy-2-phenoxy)titanium dichloride, dimethylsilylene(trimethylsilylcyclopentadienyl)(3-tert-butyl-5-chloro-2-phenoxy)titanium dichloride, dimethylsilylene(trimethylsilylcyclopentadienyl)(3,5-diamyl-2-phenoxy)titanium dichloride, dimethylsilylene(trimethylsilylcyclopentadienyl)(3-phenyl-2-phenoxy)titanium dichloride, dimethylsilylene(trimethylsilylcyclopentadienyl)(1-naphthox-2-yl)titanium dichloride, dimethylsilylene(indenyl)(2-phenoxy)titanium dichloride, dimethylsilylene(indenyl)(3-methyl-2-phenoxy)titanium dichloride, dimethylsilylene(indenyl)(3,5-dimethyl-2-phenoxy)titanium dichloride, dimethylsilylene(indenyl)(3-tert-butyl-2-phenoxy)titanium dichloride, dimethylsilylene(indenyl)(3-tert-butyl-5-methyl-2-phenoxy)titanium dichloride, dimethylsilylene(indenyl)(3,5-di-tert-butyl-2-phenoxy)titanium dichloride, dimethylsilylene(indenyl)(5-methyl-3-phenyl-2-phenoxy)titanium dichloride, dimethylsilylene(indenyl)(3-tert-butyldimethylsilyl-5-methyl-2-phenoxy)titanium dichloride, dimethylsilylene(indenyl)(5-methyl-3-trimethylsilyl-2-phenoxy)titanium dichloride, dimethylsilylene(indenyl)(3-tert-butyl-5-methoxy-2-phenoxy)titanium dichloride, dimethylsilylene(indenyl)(3-tert-butyl-5-chloro-2-phenoxy)titanium dichloride, dimethylsilylene(indenyl)(3,5-diamyl-2-phenoxy)titanium dichloride, dimethylsilylene(indenyl)(3-phenyl-2-phenoxy)titanium dichloride, dimethylsilylene(indenyl)(1-naphthox-2-yl)titanium dichloride, dimethylsilylene(fluorenyl)(2-phenoxy)titanium dichloride, dimethylsilylene(fluorenyl)(3-methyl-2-phenoxy)titanium dichloride, dimethylsilylene(fluorenyl)(3,5-dimethyl-2-phenoxy)titanium dichloride, dimethylsilylene(fluorenyl)(3-tert-butyl-2-phenoxy)titanium dichloride, dimethylsilylene(fluorenyl)(3-tert-butyl-5-methyl-2-phenoxy)titanium dichloride, dimethylsilylene(fluorenyl)(3,5-di-tert-butyl-2-phenoxy)titanium dichloride, dimethylsilylene(fluorenyl)(5-methyl-3-phenyl-2-phenoxy)titanium dichloride, dimethylsilylene(fluorenyl)(3-tert-butyldimethylsilyl-5-methyl-2-phenoxy)titanium dichloride, dimethylsilylene(fluorenyl)(5-methyl-3-trimethylsilyl-2-phenoxy)titanium dichloride, dimethylsilylene(fluorenyl)(3-tert-butyl-5-methoxy-2-phenoxy)titanium dichloride, dimethylsilylene(fluorenyl)(3-tert-butyl-5-chloro-2-phenoxy)titanium dichloride, dimethylsilylene(fluorenyl)(3,5-diamyl-2-phenoxy)titanium dichloride, dimethylsilylene(fluorenyl)(3-phenyl-2-phenoxy)titanium dichloride, dimethylsilylene(fluorenyl)(1-naphthox-2-yl)titanium dichloride, (tert-butylamido)tetramethylcyclopentadienyl-1,2-ethandiyltitanium dichloride, (methylamido)tetramethylcyclopentadienyl-1,2-ethandiyltitanium dichloride, (ethylamido)tetramethylcyclopentadienyl-1,2-ethandiyltitanium dichloride, (tert-butylamido)tetramethylcyclopentadienyldimethylsilanetitanium dichloride, (benzylamido)tetramethylcyclopentadienyldimethylsilanetitanium dichloride, (phenylphosphide)tetramethylcyclopentadienyldimethylsilanetitanium dichloride, (tert-butylamido)indenyl-1,2-ethandiyltitanium dichloride, (tert-butylamido)tetrahydroindenyl-1,2-ethandiyltitanium dichloride, (tert-butylamido)fluorenyl-1,2-ethandiyltitanium dichloride, (tert-butylamido)indenyldimethylsilanetitanium dichloride, (tert-butylamido)tetrahydroindenyldimethylsilanetitanium dichloride, (tert-butylamido)fluorenyldimethylsilanetitanium dichloride, (dimethylaminomethyl)tetramethylcyclopentadienyltitanium(III) dichloride, (dimethylaminoethyl)tetramethylcyclopentadienyltitanium(III) dichloride, (dimethylaminopropyl)tetramethylcyclopentadienyltitanium(III) dichloride, (N-pyrrolidinylethyl)tetramethylcyclopentadienyltitanium dichloride, (B-dimethylaminoborabenzene)cyclopentadienyltitanium dichloride, cyclopentadienyl(9-mesitylboraanthracenyl)titanium dichloride, etc.; as well as analogous compounds of those titanium compounds in which a titanium atom is replaced by a zirconium atom or a hafnium atom, or a 2-phenoxy group is replaced by a 3-phenyl-2-phenoxy group, a 3-trimethylsilyl-2-phenoxy group or a 3-tert-butyldimethylsilyl-2-phenoxy group, or a dimethylsilylene group is replaced by a methylene group, an ethylene group, a dimethylmethylene group (an isopropylidene group), a diphenylmethylene group, a diethylsilylene group, a diphenylsilylene group or a dimethoxysilylene group, or dichloride is replaced by difluoride, dibromide, diiodide, dimethyl, diethyl, diisopropyl, diphenyl, dibenzyl, dimethoxide, diethoxide, di(n-propoxide), di(isopropoxide), diphenoxide or di(pentafluorophenoxide), or trichloride is replaced by trifluoride, tribromide, triiodide, trimethyl, triethyl, triisopropyl, triphenyl, tribenzyl, trimethoxide, triethoxide, tri(n-propoxide), tri(isopropoxide), triphenoxide or tri(pentafluorophenoxide).

Specific examples of the μ-oxo type transition metal compound represented by the general formula [1] include μ-oxo-bis[isopropylidene(cyclopentadienyl)(2-phenoxy)titanium chloride], μ-oxo-bis[isopropylidene(cyclopentadienyl)(3-tert-butyl-5-methyl-2-phenoxy)titanium chloride], μ-oxo-bis[isopropylidene(methylcyclopentadienyl)(2-phenoxy)titanium chloride], μ-oxo-bis[isopropylidene(methylcyclopentadienyl)(3-tert-butyl-5-methyl-2-phenoxy)titanium chloride], μ-oxo-bis[isopropylidene(tetramethylcyclopentadienyl)(2-phenoxy)titanium chloride], μ-oxo-bis[isopropylidene(tetramethylcyclopentadienyl)(3-tert-butyl-5-methyl-2-phenoxy)titanium chloride], μ-oxo-bis[dimethylsilylene(cyclopentadienyl)(2-phenoxy)titanium chloride], μ-oxo-bis[dimethylsilylene(cyclopentadienyl)(3-tert-butyl-5-methyl-2-phenoxy)titanium chloride], μ-oxo-bis[dimethylsilylene(methylcyclopentadienyl)(2-phenoxy)titanium chloride], μ-oxo-bis[dimethylsilylene(methylcyclopentadienyl)(3-tert-butyl-5-methyl-2-phenoxy)titanium chloride], μ-oxo-bis[dimethylsilylene(tetramethylcyclopentadienyl)(2-phenoxy)titanium chloride], μ-oxo-bis[dimethylsilylene(tetramethylcyclopentadienyl)(3-tert-butyl-5-methyl-2-phenoxy)titanium chloride], etc., as well as analogous compounds of these compounds in which chloride is replaced by fluoride, bromide, iodide, methyl, ethyl, isopropyl, phenyl, benzyl, methoxide, ethoxide, n-propoxide, isopropoxide, phenoxide or pentafluorophenoxide.

In a preferred embodiment, the ethylene-α-olefin copolymer of the present invention may be prepared by copolymerizing ethylene and an α-olefin in the presence of a polymerization catalyst which is prepared by allowing a co-catalyst carrier (A) carrying the following co-catalyst component (I), a metallocene complex (B) comprising a ligand having a structure formed by bonding two cyclopentadiene-form anion structures with a bridging group such as an alkylene group or a silylene group, and an organic aluminum compound (C) to contact to one another.

Co-catalyst Carrier (A):

A carrier prepared by allowing diethyl zinc (hereinafter referred to as component (a)), a fluorinated phenol (hereinafter referred to as component (b)), water (hereinafter referred to as component (c)), an inorganic fine granular carrier (hereinafter referred to as component (d)) and trimethyldisilazane (($CH_3$)$_3$Si)$_2$NH: hereinafter referred to as component (e)) to contact to one another.

An ethylene-α-olefin copolymer having a small C-value can be obtained by using 3,4,5-trifluorophenol, 3,4,5-tris(trifluoromethyl)phenol, 3,4,5-tris(pentafluorophenyl)phenol, 3,5-difluoro-4-pentafluorophenylphenol or 4,5,6,7,8-pentafluoro-2-naphthol as the component (b).

The component (b) is more preferably 3,4,5-trifluorophenol or 4,5,6,7,8-pentafluoro-2-naphthol, more preferably 3,4,5-trifluorophenol.

The inorganic granular carrier of the component (d) is preferably silica gel.

According to the present invention, the components (a), (b) and (c) are used so that x and y as the molar ratio of the amounts of the components, when component (a):component (b):component (c) is expressed by 1:y:z, satisfy the following equations in the present invention:

$$|2-y-2z| \leq 1 \quad (2)$$

$$z \geq -2.5y+2.48 \quad (3)$$

$$y<1 \quad (4)$$

provided that y and z represent numbers larger than 0.

The molar ratio y of the amount of the component (b) to the amount of the component (a), and the molar ratio z of the amount of the component (c) to the amount of the component (a) are not particularly restricted as long as y and z satisfy the equations (2), (3) and (4). When z is smaller than the value of the right side of the equation (3), the flow activation energy (Ea) of the ethylene-α-olefin copolymer obtained may decrease. When y is larger than the value of the right side of the equation (4), the flow activation energy (Ea) of the ethylene-α-olefin copolymer may decrease. Specifically, while y is usually in the range from 0.55 to 0.99, it is preferably in the range from 0.55 to 0.95, more preferably from 0.6 to 0.9, and most preferably from 0.7 to 0.8.

The amount of the component (d) used relative to the amount of the component (a) is preferably such that the amount of the zinc atom emanating from diethyl zinc of the component (a) contained in the particles obtained by the contact of the component (a) and component (b) is preferably at least 0.1 mmol, more preferably from 0.5 to 20 mmol, in terms of moles of the zinc atom contained in 1 g of the particles obtained. The amount of the component (e) used relative to the amount of the component (d) used in the inorganic fine granular carrier is such that the amount of trimethylsilazane of the component (e) is preferably at least 0.1 mmol, more preferably from 0.5 to 20 mmol, per 1 g of the inorganic fine granular carrier.

The metal atom of the metallocene complex (B) comprising a ligand having such a structure that two cyclopentadiene-form anion structures are bonded with a bridging group such as alkylene group and a silylene group is preferably a Group IV atom, more preferably zirconium and hafnium. The ligand is preferably an indenyl group, a methylindenyl group, a methyl a cyclopentadienyl group or a dimethylcyclopentadienyl group, and the bridging group is preferably an ethylene group, a dimethylmethylene group or a dimethylsilylene group. The remaining substituent bonded to the metal atom is preferably a diphenoxy group or a dialkoxy group. An example of the preferable metallocene complex (B) is ethylene bis(1-indenyl)zirconium diphenoxide.

Examples of the organic aluminum compound (C) include trimethylaluminum, triethylaluminum, tributylaluminum, tirisobutylaluminum and tri-n-octylaluminum, and triisobutylaluminum and tri-n-octylaluminum are preferable.

The amount of the metallocene complex (B) is preferably in the range from $5 \times 10^{-6}$ to $5 \times 10^{-4}$ mol per 1 g of the co-catalyst carrier (A). The amount of the organic aluminum compound (C) is preferably from 1 to 2,000 in terms of a ratio (Al/M) of the moles of the organic aluminum compound (C) to the moles of the metal atom of the metallocene complex (B).

The polymerization catalyst formed by allowing the co-catalyst carrier (A), metallocene complex (B) and organic aluminum compound (C) to contact to one another may be optionally formed by allowing an electron donor compound (D) to contact the co-catalyst carrier (A), metallocene complex (B) and organic aluminum compound (C). Preferable examples of the electron donor compound (D) include triethylamine and tri-n-octylamine.

Preferably, the electron donor compound (D) is used from the viewpoint of increasing a molecular weight distribution of the ethylene-α-olefin copolymer obtained. The amount of the electron donor compound (D) is more preferably at least 0.1 mol %, further preferably at least 1 mol % relative to the moles of the aluminum atom of the organic aluminum compound (C). The amount of the electron donor compound (D) is preferably 10 mol % or less, more preferably 5 mol % or less, from the viewpoint of enhancing polymerization activity.

The ethylene-α-olefin copolymer of the present invention can be obtained by copolymerizing ethylene and an α-olefin using a pre-polymerization catalyst component as a catalyst component or a catalyst. The pre-polymerization catalyst component is prepared by polymerizing a small amount of an olefin (hereinafter referred to as pre-polymerization) using the co-catalyst component carrier (A) prepared by supporting the co-catalyst component (I) on the fine granular carrier, for example, using the co-catalyst carrier (A), metallocene complex and organic aluminum compound.

Examples of the organic aluminum compound include trimethyl aluminum, triethyl aluminum, tributyl aluminum, triisobutylaluminum and tri-n-octyl aluminum, preferably triisobutylaluminum and tri-n-octyl aluminum.

The pre-polymerization catalyst component used for producing the ethylene-α-olefin copolymer of the present invention is produced by allowing the co-catalyst carrier (A), metallocene complex and organic aluminum compound to contact to one another by a treatment process comprising the following steps (1), (2) and (3):

Step (1): heating a solution of a saturated aliphatic hydrocarbon solvent containing the metallocene complex at 40° C. or higher.

Step (2): allowing the heat-treated mixture from the step (1) to contact to the co-catalyst (A).

Step (3): allowing the contact treatment product from the step (2) to contact to the organic aluminum compound.

The step (1) comprises heating the saturated aliphatic hydrocarbon solvent containing the metallocene complex at 40° C. or higher. The solution of the saturated aliphatic hydrocarbon solvent containing the metallocene complex is prepared by adding the metallocene complex to the saturated aliphatic hydrocarbon solvent. The metallocene complex is usually added in the form of a powder or a slurry of the complex in the saturated aliphatic hydrocarbon compound.

Examples of the saturated aliphatic hydrocarbon compound used as a solvent include propane, n-butane, isobutane, n-pentane, isopentane, n-hexane, cyclohexane and heptane. These hydrocarbons can be used alone, or as a mixture of two or more of them. The saturated aliphatic hydrocarbon compound preferably has a boiling point of 100° C. or less, preferably 90° C. or less, at an atmospheric pressure. In particular, propane, n-propane, isobutane, n-pentane, isopentane, n-hexane and cyclohexane are preferable.

For heating the saturated aliphatic hydrocarbon solvent containing the metallocene-base catalyst, the temperature of the solvent containing the metallocene-base catalyst may be adjusted at a temperature of 40° C. or higher. The solvent may be allowed to stand or may be stirred during the heating. The temperature is preferably 45° C. or higher, more preferably 50° C. or higher, from the viewpoint of enhancing molding processability. The temperature is preferably 100° C. or less, more preferably 80° C. or less, from the viewpoint of enhancing catalytic activity. The heating time is usually from 0.5 to 12 hours, preferably at least 1 hour, more preferably at least 2 hours, from the viewpoint of enhancing molding processability. The heating time is preferably 6 hours or less, more preferably 4 hours or less, from the viewpoint of the stability of the performances of the catalyst.

The step (2) comprises conducting the contact treatment of the heated mixture (the saturated aliphatic hydrocarbon solvent containing the metallocene complex) from the step (1) and the co-catalyst carrier (A). In this contact treatment step, it is sufficient that the heated mixture is contacted to the co-catalyst carrier (A). Usually, a method comprising adding the co-catalyst carrier (A) to the heated mixture, or a method comprising adding the heated mixture and the co-catalyst carrier (A) to a saturated aliphatic hydrocarbon compound may be used. The co-catalyst carrier (A) is usually added in the form of a powder or a slurry of the carrier (A) in the saturated aliphatic hydrocarbon compound.

The temperature in the step (2) is preferably 70° C. or less, more preferably 60° C. or less, and preferably at least 10° C., more preferably at least 20° C. The contact treatment time is usually from 0.1 to 2 hours.

The step (3) comprises contact-treating the organic aluminum compound and the contact-treated product from the step (2) (that is, the product between the heated mixture from the step (1) and the co-catalyst (A)). In the step (3), the contact treatment product obtained by the contact treatment in the step (2) may be allowed to contact to the organic aluminum compound. Usually, a method comprising adding the organic aluminum compound to the contact treatment product from the step (2), or a method comprising adding the contact treatment product from the step (2) and organic aluminum compound to a saturated aliphatic hydrocarbon compound may be used The contact treatment temperature in the step (3) is preferably 70° C. or less, more preferably 60° C. or less. The temperature is preferably 10° C. or higher, more preferably 20° C. or higher from the viewpoint of efficiently activating the pre-polymerization. The contact treatment time is usually from 0.01 to 0.5 hour.

The contact treatment in the step (3) is preferably performed in the presence of an olefin. The olefin may be one that is used as a raw material of pre-polymerization. The amount of the olefin is preferably 0.05 to 1 g per 1 g of the co-catalyst carrier (A).

The steps (1) to (3) may be performed in a pre-polymerization reaction vessel by separately adding the saturated aliphatic hydrocarbon solvent, the co-catalyst carrier (A), the metallocene complex and the organic aluminum compound to the pre-polymerization reaction vessel, or the steps (2) and (3) may be performed in the pre-polymerization reaction vessel, or only the step (3) may be performed in the pre-polymerization reaction vessel.

The olefin is pre-polymerized (polymerization of a small amount of the olefin) by the treatment process comprising the steps (1), (2) and (3) in the presence of the contact treatment product formed by allowing the co-catalyst carrier (A), metallocene complex and organic aluminum compound to contact to one another. The polymerization is usually carried out by slurry polymerization, for which any one of a batch method, a semi-batch method and a continuous method may be used. The pre-polymerization may be carried out in the presence of a chain transfer agent such as hydrogen.

When the pre-polymerization is performed by the slurry polymerization method, usually a saturated aliphatic hydrocarbon is used as a solvent. Examples of such a hydrocarbon include propane, n-butane, isobutane, n-pentane, isopentane, n-hexane, cyclohexane and heptane. These solvents may be used alone, or as a mixture of two or more of them. The saturated aliphatic hydrocarbon compound preferably has a boiling point of 100° C. or less, more preferably 90° C. or less, at an atmospheric pressure. Particularly, propane, n-butane, isobutane, n-pentane, isopentane, n-hexane and cyclohexane are preferable.

When pre-polymerization is carried out by the slurry polymerization method, the concentration of the slurry in terms of an amount of the co-catalyst (A) per 1 liter of the solvent is usually from 0.1 to 600 g, preferably from 0.5 to 300 g. The pre-polymerization temperature is usually from −20 to 100° C., preferably from 0 to 80° C. Although the pre-polymerization temperature may be appropriately changed during the pre-polymerization, a temperature at the start of the pre-polymerization is preferably 45° C. or less, more preferably 40° C. or less. The partial pressure of the olefin in the gas phase during the pre-polymerization is usually in the range from 0.001 to 2 MPa, preferably from 0.01 to 1 MPa. The pre-polymerization time is usually from 2 minutes to 15 hours.

Examples of the olefin used for the pre-polymerization include ethylene, propylene, 1-butene, 1-pentene, 1-hexene, 1-octene, 4-methyl-1-pentene, cyclopentene and cyclohexene. These olefins may be used alone or as a mixture of two or more of them. Preferably, ethylene alone or the mixture of ethylene and an α-olefin, more preferably ethylene alone or the mixture of ethylene and at least one α-olefin selected from 1-butene, 1-hexene and 1-octene may be used.

The content of the pre-polymerized polymer in the pre-polymerization catalyst component is usually from 0.01 to 1000 g, preferably from 0.05 to 500 g, and more preferably from 0.1 to 200 g, per 1 g of the co-catalyst carrier (A).

As a production method of the ethylene-α-olefin copolymer, gas phase polymerization is preferable, and continuous gas phase polymerization is more preferable. A gas phase polymerization reactor used for the polymerization method usually comprises a fluidized bed reactor, preferably a fluidized bed reactor having an expansion portion. A stirrer may be provided in the reactor.

For feeding the pre-polymerization catalyst component to the continuous polymerization reactor for forming the particles of the ethylene-α-olefin copolymer, in general, the catalyst component is supplied using an inert gas such as nitrogen and argon, hydrogen, or ethylene without moisture, or in the form of a solution or a slurry by dissolving or diluting each component with a solvent.

The polymerization temperature in the gas phase polymerization of the ethylene-α-olefin copolymer is usually lower than a temperature at which the ethylene-α-olefin copolymer melts, preferably from 0 to 150° C., and more preferably from 30 to 100° C. Further preferably, the temperature is lower than 90° C., specifically in the range from 70 to 87° C. Hydrogen may be added as a molecular weight controlling agent for the purpose of regulating the flowability of the molten ethylene-α-olefin copolymer. An inert gas may be contained in the mixed gas. A co-catalyst component such as an organic aluminum compound may optionally be used when the pre-polymerization catalyst component is used.

The C-value of the ethylene-α-olefin copolymer obtained may be adjusted by controlling the amount of hydrogen. The C-value of the ethylene-α-olefin copolymer tends to decrease as the amount of hydrogen is reduced, while the C-value of the ethylene-α-olefin copolymer tends increase as the amount of hydrogen increases. The amount of hydrogen is usually in the range from 0.0001 to 50% by mol, preferably 30% by mol or less, more preferably 20% by mol or less and further preferably 10% by mol or less, based on the amount (moles) of ethylene.

The ethylene-α-olefin copolymer of the present invention may contain conventional additives, if necessary. Examples of the additives include an antioxidant, a weather resistant agent, a lubricant, an anti-blocking agent, an antistatic agent, an anti-crowding agent, a non-dripping agent, a pigment and a filler.

Any forming method such as an extrusion molding method, for example, an inflation film forming method and a T-die film forming method, an injection molding method and a compression molding method may be used for molding the ethylene-α-olefin copolymer of the present invention. The extrusion molding method is preferably used.

The ethylene-α-olefin copolymer of the present invention may be used by forming into various shapes. While the shape of the molded articles is not particularly restricted, it may be a film, a sheet and a vessel (e.g., a tray, a bottle, etc.). The molded articles may be used as a single layer of the copolymer or as a multilayer comprising a layer of the copolymer. The molded article may preferably be used as a food packaging material used for packaging milk such as raw milk and cow milk, dairy products such as butter and fermented milk products, and dry foods; a packaging material of medicines; a packaging material of electronic parts used for packaging semiconductors and the like; and a surface protecting material.

EXAMPLES

The present invention will be illustrated by the following Examples and Comparative Examples, which do not limit the scope of the invention in any way.

The physical properties were measured in the Examples and Comparative Examples by the following methods:

(1) Melt Flow Rate (MFR; Unit: g/10 min.)

MFR was measured by Method A under a load of 21.18 N at a temperature of 190° C. according to JIS K7210-1995.

(2) Melt Flow Rate Ratio (MFRR)

A MFRR is defined as a value obtained by dividing a melt flow rate (MFR-H; unit: g/10 min.), which is measured under a load of 211.82 N at 190° C. according to JIS K7210-1995, by a melt flow rate (MFR) measured under a load of 21.18 N at 190° C. according to JIS K7210-1995.

(3) Density (d; Unit: Kg/m$^3$)

A density was measured according to Method A of JIS K7112-1980. A sample was annealed according to JIS K6760-1995.

(4) Flow Activation Energy (Ea; Unit: kJ/mol)

A melt complex viscosity-angular frequency curve under the measuring condition below at each temperature of 130° C., 150° C., 170° C. and 190° C. was measured using a viscoelastometer (Rheometrics Mechanical Spectrometer RMS-800 (trade name) manufactured by Rheometrics). Then, a master curve of the melt complex viscosity-angular frequency curve at 190° C. was created from the melt complex viscosity—angular frequency curve obtained using a calculation software Rhios V. 4.4.4 (available from Rheometrics) to determine the activation energy (Ea).

Measuring Conditions:
  Geometry: parallel plates
  Plate diameter: 25 mm
  Plate distance: 1.5 to 2 mm
  Strain: 5%
  Angular frequency: 0.1 to 100 rad/sec
  Measuring atmosphere: nitrogen (5) Maximum Take-up Velocity (MTV; Unit: m/min.)

Using a melt tension tester (manufactured by Toyo Seiki Seisakusho Ltd.), a molten resin charged in a barrel having a diameter of 9.5 mm is extruded at a specific temperature through an orifice having a diameter of 2.09 mm and a length of 8 mm at a piston lowering rate of 5.5 mm/min. (shear rate of 7.4 sec$^{-1}$). Then, the extruded molten resin is taken up around a take-up roll having a diameter of 50 mm with increasing a take-up velocity at a rate of 40 rpm/min. A take-up velocity just before the molten resin is broken is the maximum take-up velocity at the specific temperature. The maximum take-up velocity at 150° C. is expressed a $MTV_{150}$ and the maximum take-up velocity at 190° C. is expressed a $MTV_{190}$. The larger MTV means better molding processability.

(6) Melt Tension (MT; Unit: cN)

Using a melt tension tester (manufactured by Toyo Seiki Seisakusho Ltd.), a molten resin charged in a barrel having a diameter of 9.5 mm is extruded at a specific temperature through an orifice having a diameter of 2.09 mm and a length of 8 mm at a piston lowering rate of 5.5 mm/min. (shear rate of 7.4 sec$^{-1}$). Then, the extruded molten resin is taken up around a take-up roll having a diameter of 50 mm with increasing a take-up velocity at a rate of 40 rpm/min. A melt tension just before the molten resin is broken is the melt tension at the specific temperature. The melt tension at 150° C. is expressed a $MT_{150}$ and the melt tension at 190° C. is expressed a $MT_{190}$. The larger MT means better molding processability.

(7) Molecular Weight Distribution (Mw/Mn)

A weight average molecular weight (Mw) and a number average molecular weight (Mn) were measured under the conditions (1) to (8) below using a gel permeation chromatograph (GPC) to determine a molecular weight distribution (Mw/Mn). The base line of chromatogram was defined as a linear line obtained by connecting a point in a stable horizontal region, which has a sufficiently short retention time before appearing an elution peak of a sample, and a point in a stable horizontal region having a sufficiently long retention time after appearing an elution peak of a solvent.

(1) Apparatus: Waters 150C (trade name) manufactured by Waters (2) Separation column: TOSOH TSKgel GMH6-HT (trade name)

(3) Measuring temperature: 140° C.

(4) Carrier: o-dichlorobenzene (5) Flow rate: 1.0 mL/min (6) Injection volume: 500 μL (7) Detector: differential diffractometer (8) Molecular weight standard substance: standard polystyrene (8) Kneading Torque Value (Unit: N·m)

A sample was kneaded using Plasticoder PLV-151 (trade name: manufactured by Brabender Co.) with a volume of a mixing part of 60 cc using 40 g of a resin amount at 160° C. at a revolution speed of 60 rpm, and a torque after 30 minutes from the start of kneading was measured. The smaller torque means better molding processability.

(9) Hexane Extraction Rate (C; Unit: wt %)

An ethylene-α-olefin copolymer was formed into a film having a thickness of 100 μm using a hot press at 150° C., and a sample piece with a weight of about 1 g was cut out from the film. The test piece was placed in a flask, 400 mL of n-hexane was added to the sample in the flask, and the flask was heated on a water bath kept at a temperature of 50° C.±0.2° C. in advance. The solution was stirred for 2 hours with a magnetic stirrer after the temperature of n-hexane reached 50° C. After stirring, a part of the sample insoluble in n-hexane was removed by filtration. n-Hexane was evaporated off from the filtrate collected, followed by vacuum drying for 2 hours to obtain and a dried residue. The hexane extraction rate was calculated using the weight sampled in the flask and the weight of the dried residue obtained from the filtrate.

$C=100\times[\text{weight of dried residue (g)/weight of sample (g)}]$

(10) Amount of Fume in Melt Processing (Unit: CPM)

A T-die (die width: 200 mm, die lip: 0.4 mm) was attached to an extruder with a diameter of 30 mm (manufactured by Union), and the temperature of the die was adjusted at 290° C. An ethylene-α-olefin copolymer was extruded from the extruder at a rate of 4 kg/h, and fume generated in 1 minute was collected. The amount of fume was measured using a digital dust counter Model 3411 (trade name: manufactured by Nippon Kanomax Co., Ltd.). An average of the values obtained by five measurements was used as the amount of fume. One (1) CPM corresponds to an amount of fume of 0.01 mg/m$^3$ of stearic acid particles with a size of 0.3 μm.

Example 1

(1) Preparation of Co-catalyst Carrier

To a nitrogen-purged rector equipped with a stirrer, 2.8 kg of silica (Sylopol 1948 manufactured by Debison; 50% volume average particle diameter=55 μm, pore volume=1.67 ml/g, specific surface area=325 m$^2$/g), which had been heat treated at 300° C. in nitrogen stream, and 24 kg of toluene were added, and the mixture was stirred. After cooling to 5° C., a solution of 0.9 kg of 1,1,1,3,3,3-hexamethyldisilazane in 1.4 kg of toluene was dropwise added over 30 minutes while keeping the temperature of the reactor at 5° C. After completing dropwise addition, the mixture was stirred at 5° C. for 1 hour followed by heating to 95° C. and stirring at 95° C. for 3 hours. The solution was filtered, and a solid product obtained was washed with 20.8 kg of toluene 6 times. Thereafter, a slurry was prepared by adding 7.1 kg of toluene and allowed to stand overnight.

To the slurry obtained above, 3.46 kg of a hexane solution of diethyl zinc (diethyl zinc concentration: 50 wt %) and 2.05 kg of hexane were added, and the mixture was stirred. After cooling to 5° C., a solution of 1.55 kg of 3,4,5-trifluorophenol in 2.88 kg of toluene was dropwise added to the mixture over 60 minutes, while keeping the temperature of the reactor at 5° C. After completing the dropwise addition, the mixture was stirred at 5° C. for 1 hour, then heated to 40° C., and further stirred at 40° C. for 1 hour. Thereafter, the mixture was cooled to 5° C., and 0.221 kg of water was dropwise added over 1.5 hours while keeping the temperature of the reactor at 40° C. After completing the dropwise addition, the mixture was stirred at 5° C. for 1.5 hours followed by heating at 40° C. The mixture was stirred at 40° C. for 2 hours and then heated to 80° C., followed by stirring at 80° C. for 2 hours. After stirring, the supernatant was removed at a room temperature until the volume of the residue becomes 16 L. To the residue, 11.6 kg of toluene was added, and the mixture was heated at 95° C. for 4 hours while stirring. The supernatant was removed at a room temperature after stirring to obtain a solid product. The solid product obtained was washed 4 times with 20.8 kg of toluene and 3 times with 24 L of hexane. Then, a solid component (hereinafter referred to as co-catalyst carrier (a1)) was obtained by drying.

(2) Preparation of Pre-polymerization Catalyst Component

After adding 80 L of butane to an autoclave having an interior volume of 210 L equipped with a stirrer and purged with nitrogen in advance, 144 mmol of racemic ethylene bis(1-indenyl)zirconium diphenoxide was added to the autoclave, and the mixture was heated to 50° C. and stirred for 2 hours. Subsequently, 0.5 kg of the co-catalyst carrier (a1) was added to the autoclave, which was cooled to 31° C. When the reaction system was stabilized, 0.1 kg of ethylene and 0.1 L of hydrogen (a volume at a room temperature under an atmospheric pressure) were added to the autoclave followed by adding 207 mmol of triisobutylaluminum to initiate polymerization. Ethylene and hydrogen were continuously supplied at rates of 0.6 kg/hr and 0.5 L/hr (volumes at a room temperature under an atmospheric pressure), respectively. After a time lapse of 30 minutes, the temperature of the autoclave was raised to 50° C. while continuously supplying ethylene and hydrogen at rates of 3.6 kg/hr and 10.9 L/hr (volumes at a room temperature under an atmospheric pressure), respectively, to carry out pre-polymerization for 6 hours in total. After completing polymerization, ethylene, butane and hydrogen were purged, and the residual solid was dried in vacuum at a room temperature to obtain a pre-polymerization component containing 37 g of polyethylene per 1 g of the co-catalyst carrier (a1). [η] of polyethylene was 1.51 dl/g.

(3) Production of Ethylene-α-olefin Copolymer

Ethylene and 1-hexene were copolymerized in a continuous fluidized bed gas phase polymerization reactor using the pre-polymerization catalyst component obtained above to obtain a copolymer powder. The polymerization temperature was 85° C., the polymerization pressure was 2 MPa, the molar ratio of hydrogen to ethylene was 1.5%, and the molar ratio of 1-hexene to the total mole of ethylene and 1-hexene was 1.0%. Ethylene, 1-hexene and hydrogen were continuously supplied to maintain the gas composition constant during polymerization. The pre-polymerization catalyst component, triisobutylaluminum and triethylamine (a molar ratio of 3% relative to the triisobutylaluminum component) were also continuously supplied, and the weight of the total powder in the fluidized bed was kept constant at 80 kg. An average polymerization time was 3.8 hours. An antioxidant (750 ppm; Sumilizer GP (trade name), manufactured by Sumitomo Chemical Co., Ltd.) was blended with the polymer powder obtained, and the mixture was granulated with an extruder (LCM 50 (trade name), manufactured by Kobe Steel Ltd.) under conditions of a feed rate of 50 kg/hr, a screw rotation speed of 450 rpm, a gate aperture of 50%, a suction pressure of 0.1 MPa and a resin temperature of from 200 to 230° C. to obtain an ethylene-1-hexene copolymer. The results of property evaluations of the ethylene-1-hexene copolymer are shown in Table 1.

Example 2

(1) Preparation of Pre-polymerization Catalyst Component

After adding 80 L of butane to an autoclave having an interior volume of 210 L equipped with a stirrer and purged with nitrogen in advance, 146 mmol of racemic ethylene bis(1-indenyl)zirconium diphenoxide was added to the autoclave, and the mixture was heated to 50° C. and stirred for 2 hours. Subsequently, after cooling the autoclave to 31° C. and stabilizing the reaction system, 0.1 kg of ethylene and 0.1 L of hydrogen (a volume at a room temperature under an atmospheric pressure) were added to the reaction mixture. Then, 0.7 kg of the co-catalyst carrier (a1) obtained in preparation of the co-catalyst carrier in Step (1) of Example 1 was added to the reaction system followed by adding 280 mmol of triisobutylaluminum to initiate polymerization. After a time lapse of 30 minutes while continuously supplying ethylene and hydrogen at rates of 0.6 kg/hr and 0.7 L/hr (volumes at a room temperature under an atmospheric pressure), respectively, the reaction temperature was raised to 51° C., and ethylene and hydrogen were continuously supplied at rates of 4.5 kg/hr and 13.4 L/hr (volumes at a room temperature under an atmospheric pressure), respectively, to carry out pre-polymerization for 6 hours in total. After completing polymerization, the residual solid remaining after purging ethylene, butane and hydrogen gas was dried in vacuum at a room temperature to obtain a pre-polymerization catalyst component containing 33.5 g of polyethylene per 1 g of the co-catalyst carrier (a1). [η] of polyethylene was 1.45 dl/g.

(2) Production of Ethylene-α-olefin Copolymer

Ethylene, 1-butene and 1-hexene were copolymerized with a continuous fluidized bed gas phase polymerization reactor using the pre-polymerization catalyst component obtained above, to obtain a polymer powder. The polymerization conditions included a polymerization temperature of 87° C., a polymerization pressure of 2 MPa, a molar ratio of hydrogen to ethylene of 1.3%, molar ratios of 1-butene and 1-hexene to the total mole of ethylene, 1-butene and 1-hexene of 2.1% and 0.7%, respectively. Ethylene, 1-butene, 1-hexene and hydrogen were continuously supplied for maintaining the gas composition constant during polymerization. The pre-polymerization catalyst component, triisobutylaluminum and triethylamine (a molar ratio of 3% relative to triisobutylaluminum) were also continuously supplied, and the weight of the total powder on the fluidized bed was kept constant at 80 kg. An average polymerization time was 4.4 hr. An antioxidant (50 ppm: Sumilizer GP (trade name) manufactured by Sumitomo Chemical Co., Ltd.) was blended with the polymer powder obtained, and the mixture was granulated using an extruder (LCM 50 trade name) manufactured by Kobe Steel Ltd.) under conditions of a feed rate of 50 kg/hr, a screw rotation speed of 450 rpm, a gate aperture of 50%, a suction pressure of 0.1 MPa and a resin temperature of from 200 to 230° C. to obtain an ethylene-1-butene-1-hexene copolymer. The results of the property evaluations of the ethylene-1-butene-1-hexene copolymer are shown in Table 1.

Example 3

(1) Preparation of Co-catalyst Carrier

To a nitrogen-purged rector equipped with a stirrer, 2.8 kg of silica (Sylopol 1948 manufactured by Debison, 50% volume average particle diameter=55 μm, pore volume=1.67 ml/g, specific surface area=325 m$^2$/g), which had been heat-treated at 300° C. in nitrogen stream, and 24 kg of toluene were added, and the mixture was stirred. After cooling to 5° C., a solution of 0.9 kg of 1,1,1,3,3,3-hexamethyldisilazane in 1.4 kg of toluene was dropwise added over 30 minutes while keeping the temperature of the reactor at 5° C. After completing dropwise addition, the mixture was stirred at 5° C. for 1 hour, heated to 95° C. and further stirred at 95° C. for 3 hours. The solution was filtered, and a solid product obtained was washed with 20.8 kg of toluene 6 times. Thereafter a slurry was prepared by adding 7.1 kg of toluene, and was allowed to stand overnight.

To the slurry obtained above, 1.73 kg of a solution of diethyl zinc in hexane (diethyl zinc concentration: 50 wt %) and 1.02 kg of hexane were added, and the mixture was stirred. After cooling to 5° C., a solution of 0.78 kg of 3,4,5-trifluorophenol in 1.44 kg of toluene was dropwise added to the mixture over 60 minutes while keeping the temperature of the reactor at 5° C. After completing dropwise addition, the mixture was stirred at 5° C. for 1 hour, then heated to 40° C., and further stirred at 40° C. for 1 hour. Thereafter, the mixture was cooled to 22° C., and 0.11 kg of water was added over 1.5 hours while keeping the temperature of the reactor at 22° C. After completing dropwise addition, the mixture was stirred at 22° C. for 1.5 hours followed by heating to 40° C. The mixture was stirred at 40° C. for 2 hours and then heated to 80° C., followed by stirring at 80° C. for 2 hours. After stirring, the supernatant was removed at a room temperature until the volume of the residue becomes 16 L, 11.6 kg of toluene was added to the residue, and the mixture was heated at 95° C. while stirring for 4 hours. After stirring, the supernatant was removed at a room temperature to obtain a solid product. The solid product obtained was washed 4 times with 20.8 kg of toluene and 3 times with 24 L of hexane. Then, co-catalyst carrier (a2) was obtained by drying.

(2) Preparation of Pre-polymerization Catalyst Component

After adding 80 L of butane to an autoclave having an interior volume of 210 L equipped with a stirrer and purged with nitrogen in advance, 91 mmol of racemic ethylene bis (1-indenyl)zirconium diphenoxide was added to the autoclave, and the mixture was heated to 50° C. and stirred for 2 hours. Subsequently, after cooling the autoclave to 30° C. and stabilizing the reaction system, 0.1 kg of ethylene and 0.1 L of hydrogen (a volume at a room temperature under an atmospheric pressure) were added to the reaction mixture. Then, 0.7 kg of the co-catalyst carrier (a2) obtained in preparation of the co-catalyst carrier in Step (1) of Example 3 was added to the reaction system followed by adding 263 mmol of triisobutylaluminum to initiate polymerization. After a time lapse of 30 minutes while continuously supplying ethylene and hydrogen at rates of 0.9 kg/hr and 0.7 L/hr (volumes at a room temperature under an atmospheric pressure), respectively, the reaction temperature was raised to 50° C., and ethylene and hydrogen were continuously supplied at rates of 4.5 kg/hr and 13.4 L/hr (volumes at a room temperature under an atmospheric pressure), respectively, to carry out pre-polymerization for 6 hours in total. After completing polymerization, the residual solid remaining after purging ethylene, butane and hydrogen gas was dried in vacuum at a room temperature to obtain a pre-polymerization catalyst component containing 33.8 g of polyethylene per 1 g of the co-catalyst carrier (a2). [η] of polyethylene was 1.21 dl/g.

(3) Production of Ethylene-α-olefin Copolymer

Ethylene and 1-hexene were copolymerized with a continuous fluidized bed gas phase polymerization reactor by the same method as in Example 1, except that the pre-polymerization catalyst component obtained above was used, the polymerization temperature was changed to 84° C., the molar ratio of hydrogen to ethylene was changed to 1.2%, and the molar ratio of 1-hexene to the total mole of ethylene and hexene was changed to 1.4%. Then, the ethylene-1-hexene copolymer was granulated as in Example 1. The results of property evaluations of the ethylene-1-hexene copolymer are shown in Table 1.

Example 4

(1) Production of Ethylene-α-olefin Copolymer

Ethylene and 1-hexene were copolymerized with a continuous fluidized bed gas phase polymerization reactor by the same method as in Example 1, except that the pre-polymerization catalyst component obtained in (3) of Example 3 was used, the polymerization temperature was changed to 84° C., the molar ratio of hydrogen to ethylene was changed to 0.8%, and the molar ratio of 1-hexene to the total mole of ethylene and hexene was changed to 1.5%. Then, the ethylene-1-hexene copolymer was granulated as in Example 1. The results of property evaluations of the ethylene-1-hexene copolymer are shown in Table 1.

Example 5

(1) Preparation of Pre-polymerization Catalyst Component

After adding 80 L of butane to an autoclave having an interior volume of 210 L equipped with a stirrer and purged with nitrogen in advance, 106 mmol of racemic ethylene bis(1-indenyl)zirconium diphenoxide was added to the autoclave, and the mixture was heated to 50° C. and stirred for 2 hours. Subsequently, after cooling the autoclave to 31° C. and stabilizing the reaction system, 0.2 kg of ethylene and 2 L of hydrogen (a volume at a room temperature under an atmospheric pressure) were added to the reaction mixture. Then, 0.7 kg of the co-catalyst carrier (a1) obtained in preparation of the co-catalyst carrier in Step (1) of Example 1 was added to the reaction system followed by adding 158 mmol of triisobutylaluminum to initiate polymerization. After a time lapse of 30 minutes while continuously supplying ethylene and hydrogen at rates of 0.7 kg/hr and 4.2 L/hr (volumes at a room temperature under an atmospheric pressure), respectively, the reaction temperature was raised to 51° C., and ethylene and hydrogen were continuously supplied at rates of 3.5 kg/hr and 21 L/hr (volumes at a room temperature under an atmospheric pressure), respectively, to carry out pre-polymerization for 4 hours in total. After completing polymerization, the residual solid remaining after purging ethylene, butane and hydrogen gas was dried in vacuum at a room temperature to obtain a pre-polymerization catalyst component containing 16.2 g of polyethylene per 1 g of the co-catalyst carrier (a1). [η] of polyethylene was 1.04 dl/g.

(2) Production of Ethylene-α-olefin Copolymer

Ethylene and 1-hexene were copolymerized with a continuous fluidized bed gas phase polymerization reactor by the same method as in Example 1, except that the pre-polymerization catalyst component obtained above was used, the polymerization temperature was changed to 85° C., the molar ratio of hydrogen to ethylene was changed to 1.4%, and the molar ratio of 1-hexene to the total mole of ethylene and 1-hexene was changed to 1.4%. Then, the ethylene-1-hexene copolymer was granulated as in Example 1. The results of the property evaluations of the ethylene-1-hexene copolymer are shown in Table 1.

Example 6

(1) Production of Ethylene-α-olefin Copolymer

Ethylene and 1-hexene were copolymerized with a continuous fluidized bed gas phase polymerization reactor by the same method as in Example 1, except that the pre-polymerization catalyst component obtained in Step (1) of Example 5 was used, the polymerization temperature was changed to 85° C., the molar ratio of hydrogen to ethylene was changed to 1.8%, and the molar ratio of 1-hexene to the total mole of ethylene and 1-hexene was changed to 1.3%. Then, the ethylene-1-hexene copolymer was granulated as in Example 1. The results of the property evaluations of the ethylene-1-hexene copolymer are shown in Table 1.

Example 7

(1) Preparation of Pre-polymerization Catalyst Component

After adding 80 L of butane to an autoclave having an interior volume of 210 L equipped with a stirrer and purged with nitrogen in advance, 87 mmol of racemic ethylene bis (1-indenyl)zirconium diphenoxide was added to the autoclave, and the mixture was heated at 50° C. and stirred for 2 hours. Subsequently, after cooling the autoclave to 31° C. and stabilizing the reaction system, 0.1 kg of ethylene and 0.1 L of hydrogen (a volume at a room temperature under an atmospheric pressure) were added to the reaction mixture. Then, 0.7 kg of the co-catalyst carrier (a2) obtained in preparation of the co-catalyst carrier in Step (1) of Example 3 was added to the reaction system followed by adding 263 mmol of triisobutylaluminum to initiate polymerization. After a time lapse of 30 minutes while continuously supplying ethylene and hydrogen at rates of 1.0 kg/hr and 1.9 L/hr (volumes at a room temperature under an atmospheric pressure), respectively, the reaction temperature was raised to 50° C., and ethylene and hydrogen were continuously supplied at rates of 3.1 kg/hr and 9.4 L/hr (the volume at a room temperature under an atmospheric pressure), respectively, to carry out pre-polymerization for 6 hours in total. After completing polymerization, the residual solid remaining after purging ethylene, butane and hydrogen gas was dried in vacuum at a room temperature to obtain a pre-polymerization catalyst component containing 21.1 g of polyethylene per 1 g of the co-catalyst carrier (a2).

(2) Production of Ethylene-α-olefin Copolymer

Ethylene and 1-hexene were copolymerized with a continuous fluidized bed gas phase polymerization reactor by the same method as in Example 1, except that the pre-polymerization catalyst component obtained above was used, the polymerization temperature was changed to 85° C., the molar ratio of hydrogen to ethylene was changed to 1.4%, and the molar ratio of 1-hexene to the total mole of ethylene and 1-hexene was changed to 1.3%. Then, the ethylene-1-hexene copolymer was granulated as in Example 1. The results of the property evaluations of the ethylene-1-hexene copolymer are shown in Table 1.

Example 8

(1) Production of Ethylene-α-olefin Copolymer

Ethylene and 1-octene were copolymerized with a continuous fluidized bed gas phase polymerization reactor by the same method as in Example 1, except that the pre-polymerization catalyst component prepared as in Step (1) of Example 7 was used, the polymerization temperature was changed to 82° C., the molar ratio of hydrogen to ethylene was changed to 1.2%, and the molar ratio of 1-octene to the total mole of ethylene and 1-octene was changed to 0.39%. Then, the ethylene-1-octene copolymer was granulated as in Example 1. The results of the property evaluations of the ethylene-1-octene copolymer are shown in Table 1.

Example 9

(1) Production of Ethylene-α-olefin Copolymer

Ethylene, 1-butene and 1-octene were copolymerized with a continuous fluidized bed gas phase polymerization reactor by the same method as in Example 1, except that the pre-polymerization catalyst component prepared in Step (1) of Example 7 was used, the polymerization temperature was changed to 84° C., the molar ratio of hydrogen to ethylene was changed to 1.4%, and the molar ratios of 1-butene and 1-octene to the total mole of ethylene, 1-butene and 1-octene were changed to 1.1% and 0.34%, respectively. Then, the ethylene-1-butene-1-octene copolymer was granulated as in Example 1. The results of the property evaluations of the ethylene-1-butene-1-octene copolymer are shown in Table 1.

Comparative Example 1

(1) Preparation of Co-catalyst Carrier

To a nitrogen-purged rector equipped with a stirrer, 2.8 kg of Silica (Sylopol 1948 manufactured by Debison, 50% volume average particle diameter=55 μm, pore volume=1.67 ml/g, specific surface area=325 m²/g), which had been heat-treated at 300° C. in nitrogen stream, and 24 kg of toluene were added, and the mixture was stirred. After cooling to 5° C., a solution of 0.91 kg of 1,1,1,3,3,3-hexamethyldisilazane and 1.43 kg of toluene was dropwise added over 33 minutes while keeping the temperature of the reactor at 5° C. After completing dropwise addition, the mixture was stirred at 5° C. for 1 hour followed by heating to 95° C. and stirred at 95° C. for 3 hours. The solution was filtered, and a solid product obtained was washed with 21 kg of toluene 5 times. Thereafter, a slurry was prepared by adding 6.9 kg of toluene and was allowed to stand overnight.

To the slurry obtained above, 2.05 kg of a solution of diethyl zinc in hexane (diethyl zinc concentration: 50 wt %) and 1.3 kg of hexane were added, and the mixture was stirred. After cooling to 5° C., a solution of 0.77 kg of pentafluorophenol in 1.17 kg of toluene was dropwise added to the mixture over 61 minutes while keeping the temperature of the reactor at 5° C. After completing dropwise addition, the mixture was stirred at 5° C. for 1 hour, then heated to 40° C. and further stirred at 40° C. for 1 hour. Thereafter, the mixture was cooled to 5° C., and 0.11 kg of water was dropwise added over 1.5 hours while keeping the temperature of the reactor at 5° C. After completing dropwise addition, the mixture was stirred at 5° C. for 1.5 hours followed by heating to 55° C. Then, the mixture was stirred at 55° C. for 2 hours. Thereafter, 1.4 kg of a solution of diethyl zinc in hexane (concentration of diethyl zinc: 50 wt %) and 0.8 kg of hexane were added. After cooling the reaction solution to 5° C., a solution of 0.42 kg of 3,4,5-trifluorophenol in 0.77 kg of toluene was dropwise added over 60 minutes while keeping the temperature of the reactor at 5° C. After completing dropwise addition, the solution was stirred at 5° C. for 1 hour, heated to 40° C. and further stirred at 40° C. for 1 hour. Thereafter, the reaction solution was cooled to 5° C., and 0.077 kg of water was dropwise added over 1.5 hours while keeping the temperature of the reactor at 5° C. After completing dropwise addition, the solution was stirred at 5° C. for 1.5 hours, heated to 40° C., and further stirred at 40° C. for 2 hours and then at 80° C. for 2 hours. After stirring, the supernatant was removed at a room temperature until the volume of the residue becomes 16 L, 11.6 kg of toluene was added to the residue, and the mixture was heated at 95° C. while stirring for 4 hours. After stirring, the supernatant was removed at a room temperature to obtain a solid product. The solid product obtained was washed 4 times with 20.8 kg of toluene and 3 times with 24 L of hexane. A solid component (hereinafter referred to as co-catalyst carrier (b)) was obtained by drying.

(2) Preparation of Pre-polymerization Catalyst Component

After adding 80 L of butane to an autoclave having an interior volume of 210 L equipped with a stirrer and purged with nitrogen in advance, 109 mmol of racemic ethylene bis(1-indenyl)zirconium diphenoxide was added to the autoclave, and the mixture was heated to 50° C. while stirring for 2 hours. Subsequently, after cooling the autoclave to 30° C. and stabilizing the reaction system, 0.05 kg of ethylene and 0.05 L of hydrogen (a volume at a room temperature under an atmospheric pressure) were added to the reaction mixture. Then, 0.7 kg of the co-catalyst carrier (b) was added to the reaction system followed by adding 158 mmol of triisobutylaluminum to initiate polymerization. After a time lapse of 30 minutes while continuously supplying ethylene and hydrogen at rates of 0.7 kg/hr and 0.7 L/hr (volumes at a room temperature under an atmospheric pressure), respectively, the reaction temperature was raised to 50° C., and ethylene and hydrogen were continuously supplied at rates of 3.5 kg/hr and 10.2 L/hr (volumes at a room temperature under an atmospheric pressure), respectively, to carry out pre-polymerization for 4 hours in total. After completing polymerization, the residual solid remaining after purging ethylene, butane and hydrogen gas was dried in vacuum at a room temperature to obtain a pre-polymerization catalyst component containing 15.9 g of polyethylene per 1 g of the co-catalyst carrier (b). [η] of polyethylene was 1.45 dl/g.

(3) Production of Ethylene-α-olefin Copolymer

Ethylene and 1-hexene were copolymerized with a continuous fluidized bed gas phase polymerization reactor by the same method as in Example 1, except that the pre-polymerization catalyst component obtained above was used, the polymerization temperature was changed to 90° C., the molar ratio of hydrogen to ethylene was changed to 1.8%, and the molar ratio of 1-hexene to the total mole of ethylene and hexene was changed to 1.1%. Then, the ethylene-1-hexene copolymer was granulated as in Example 1. The results of property evaluations of the ethylene-1-hexene copolymer are shown in Table 1.

Comparative Example 2

(1) Production of Ethylene-α-olefin Copolymer

Ethylene, 1-butene and 1-hexene were copolymerized with a continuous fluidized bed gas phase polymerization reactor by the same method as in Example 2, except that the pre-polymerization catalyst component obtained in Step (2) of Comparative Example 1 was used, the polymerization temperature was changed to 85° C., the molar ratio of hydrogen to ethylene was changed to 1.5%, and the molar ratios of 1-butene and 1-hexene to the total mole of ethylene, 1-butene and 1-hexene was changed to 2.1% and 0.6%, respectively. The ethylene-1-butene-1-hexene copolymer was granulated as in Example 2. The results of property evaluations of the ethylene-1-butene-1-hexene copolymer are shown in Table 1.

Comparative Example 3

(1) Preparation of Pre-polymerization Catalyst Component

After adding 80 L of butane to an autoclave having an interior volume of 210 L equipped with a stirrer and purged with nitrogen in advance, 74 mmol of racemic ethylene bis (1-indenyl)zirconium diphenoxide was added to the autoclave, and the mixture was heated to 50° C. and stirred for 2 hours. Subsequently, after cooling the autoclave to 33° C. and stabilizing the reaction system, 0.2 kg of ethylene and 2 L of hydrogen (a volume at a room temperature under an atmospheric pressure) were added to the reaction mixture. Then, 0.7 kg of the co-catalyst carrier (b) was added to the reaction system followed by adding 210 mmol of triisobutylaluminum to initiate polymerization. After a time lapse of 30 minutes while continuously supplying ethylene and hydrogen at rates of 0.7 kg/hr and 4.2 L/hr (volumes at a room temperature under an atmospheric pressure), respectively, the reaction temperature was raised to 50° C., and ethylene and hydrogen were continuously supplied at rates of 3.5 kg/hr and 21.0 L/hr (volumes at a room temperature under an atmospheric pressure), respectively, to carry out pre-polymerization for 4 hours in total. After completing polymerization, the residual solid remaining after purging ethylene, butane and hydrogen gas was dried in vacuum at a room temperature to obtain a pre-polymerization catalyst component containing 17.2 g of polyethylene per 1 g of the co-catalyst carrier (b). [η] of polyethylene was 0.56 dl/g.

(2) Production of Ethylene-α-olefin Copolymer

Ethylene and 1-hexene were copolymerized with a continuous fluidized bed gas phase polymerization reactor by the same method as in Example 1, except that the pre-polymerization catalyst component obtained above was used, the polymerization temperature was changed to 86° C., the molar ratio of hydrogen to ethylene was changed to 1.6%, and the molar ratio of 1-hexene to the total mole of ethylene and hexene was changed to 1.2%. Then, the ethylene-1-hexene copolymer was granulated as in Example 1. The results of evaluation for properties of the ethylene-1-hexene copolymer are shown in Table 1.

TABLE 1

| | Example No. | | | | | | | | | | | |
|---|---|---|---|---|---|---|---|---|---|---|---|---|
| | 1 | 2 | 3 | 4 | 5 | 6 | 7 | 8 | 9 | C. 1 | C. 2 | C. 3 |
| MFR (g/10 min) | 1.13 | 0.37 | 0.55 | 0.18 | 0.59 | 1.7 | 0.27 | 0.41 | 0.7 | 1.11 | 0.36 | 1.4 |
| MFRR | 77 | 117 | 91 | 138 | 102 | 73 | 158 | 106 | 87 | 83 | 130 | 85 |
| Density (kg/m$^3$) | 920.5 | 918.8 | 911.4 | 913 | 922.8 | 924.3 | 927.8 | 916 | 916.9 | 919.6 | 916.4 | 923 |
| Ea (kJ/mol) | 75 | 72 | 68 | 73 | 73 | 68 | 71 | 74 | 72 | 71 | 65 | 69 |
| MTV$_{150}$ (m/min.) | 58 | 18 | 42 | 23 | 57 | 63 | 30 | 29 | 39 | 57 | 29 | 68 |
| MTV$_{190}$ (m/min.) | 30 | 8 | 15 | 9 | 21 | 43 | 23 | 11 | 18 | 27 | 15 | 43 |
| MT$_{150}$ (cN) | 6.8 | 9.9 | 8.0 | 10.4 | 7.2 | 5.9 | 9.5 | 8.4 | 7.6 | 6.3 | 8.2 | 5.5 |
| MT$_{190}$ (cN) | 4.5 | 6.6 | 5.8 | 7.0 | 5.4 | 3.7 | 6.0 | 6.1 | 5.5 | 4.4 | 6.0 | 3.9 |
| Mw/Mn | 8.3 | 9.9 | 8.0 | 9.2 | 8.7 | 9.5 | 12.4 | 9.4 | 8.2 | 11.9 | 11.4 | 8.5 |
| Kneading torque (M/m) | 11.3 | 13.6 | 13.7 | 16.3 | 12.5 | 10.1 | 13.3 | 13.8 | 12.9 | 11 | 13.3 | 9.8 |
| C (wt %) | 1.9 | 1.7 | 2.5 | 1.9 | 1.7 | 2 | 1.7 | 2.1 | 2.1 | 2.9 | 3.2 | 3 |
| Amount of fume in melt processing | 2143 | 1775 | 756 | 728 | 1148 | 2380 | 2431 | 840 | 1080 | 3050 | 2969 | 2920 |

The invention claimed is:

1. An ethylene-α-olefin copolymer comprising repeating units derived from ethylene and repeating units derived from an α-olefin having 3 to 20 carbon atoms and having a melt tension at 190° C. of at least 6 cN, a melt flow rate (MFR) of from 0.01 to 100 g/10 min, a density (d) of from 890 to 970 kg/m$^3$, a flow activation energy (Ea) of at least 50 kJ/mol, a molecular weight distribution (Mw/Mn) of at least 3 measured by gel permeation chromatography, and a hexane extraction rate (C) of 2.8% or less.

2. The ethylene-α-olefin copolymer according to claim 1 obtained by a gas phase polymerization method in the presence of a metallocene-base olefin polymerization catalyst.

3. The ethylene-α-olefin copolymer according to claim 1 or 2, which is an ethylene-1-hexene copolymer.

4. The ethylene-α-olefin copolymer according to claim 1 or 2, which is an ethylene-1-octene copolymer.

5. The ethylene-α-olefin copolymer according to claim 1 or 2, which is an ethylene-1-butene-1-hexene copolymer.

6. The ethylene-α-olefine copolymer according to claim 1 or 2, which is an ethylene-1-butene-1-octene copolymer.

7. A food packaging material, comprising an ethylene-α-olefin copolymer according to claim 1.

* * * * *